(12) United States Patent
Thomas et al.

(10) Patent No.: US 6,487,283 B2
(45) Date of Patent: **\*Nov. 26, 2002**

(54) PRICING CENTER FOR INTERNET PROTOCOL ROUTED TRANSACTIONS

(75) Inventors: Stephen Anthony Thomas; Jason Bloomberg, both of Marietta; James P. G. Dalton, Jr., Atlanta, all of GA (US)

(73) Assignee: TransNexus, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/734,362

(22) Filed: Dec. 11, 2000

(65) Prior Publication Data

US 2001/0001000 A1 May 10, 2001

Related U.S. Application Data

(63) Continuation of application No. 09/366,984, filed on Aug. 4, 1999, now Pat. No. 6,205,211.
(60) Provisional application No. 60/095,324, filed on Aug. 4, 1998.

(51) Int. Cl.[7] .............................................. H04M 15/00
(52) U.S. Cl. .............................. 379/112.01; 379/114.05; 379/114.07; 379/121.02; 379/125; 379/128; 370/353; 370/355
(58) Field of Search ................................. 379/111, 112, 379/114, 121, 125, 127, 128, 207, 219, 220, 221; 370/351, 353, 354, 355, 356, 357

(56) References Cited

U.S. PATENT DOCUMENTS

| | | | |
|---|---|---|---|
| 4,726,056 A | 2/1988 | An et al. ..................... | 379/115 |
| 5,434,848 A | 7/1995 | Chimento, Jr. et al. ....... | 370/17 |

(List continued on next page.)

FOREIGN PATENT DOCUMENTS

| | | |
|---|---|---|
| WO | WO 97/14236 | 4/1997 |
| WO | WO 97/23078 | 6/1997 |

(List continued on next page.)

OTHER PUBLICATIONS

Thom, "H.323: The Multimedia Communications Standard for Local Area Networks," IEEE Communications Magazine, Dec. 1996, pp. 52–56.

(List continued on next page.)

*Primary Examiner*—Binh Tieu
(74) *Attorney, Agent, or Firm*—King & Spalding

(57) ABSTRACT

A call pricing center that assists Internet Protocol (IP)-compatible devices in defining preferences, including prices, for completing an IP routed transaction. A centralized routing engine associated with a clearinghouse uses the preferences to assist IP devices in making routing decisions. The pricing center provides IP network operators and retail IP telephony gateway operators with significant flexibility by allowing them to designate preferences and preference criteria. A source gateway operator may set preferences such as the maximum price that it is willing to paid for a call, the maximum delay that will be tolerated and the maximum autonomous system hop count that will be tolerated. A destination gateway operator may also set preferences relating to the prices it will charge for terminating calls. Using preference criteria, a gateway operator may specify particular times call prices are to be effective and to what called number ranges they are to be applied. Based on such preferences and preference criteria, the routing engine is able to locate destination gateways that are eligible to terminate a voice over telephony IP call. The routing engine provides a prioritized list of eligible destination gateways to the source gateway. The source gateway then works through the prioritized list and attempts to set up the IP telephony call with each eligible destination gateway, until the call is established.

20 Claims, 17 Drawing Sheets

U.S. PATENT DOCUMENTS

| | | | |
|---|---|---|---|
| 5,473,630 A | 12/1995 | Penzias et al. | 379/114 |
| 5,563,939 A | 10/1996 | La Porta et al. | 379/220 |
| 5,570,417 A | 10/1996 | Byers et al. | 379/115 |
| 5,606,602 A | 2/1997 | Johnson et al. | 379/115 |
| 5,633,919 A | 5/1997 | Hogan et al. | 379/115 |
| 5,638,433 A | 6/1997 | Bubien, Jr. et al. | 379/130 |
| 5,668,955 A | 9/1997 | deCiutiis et al. | 379/130 |
| 5,675,636 A | 10/1997 | Gray | 379/114 |
| 5,712,907 A | 1/1998 | Wegner et al. | 379/112 |
| 5,790,642 A | 8/1998 | Taylor et al. | 379/112 |
| 5,799,072 A | 8/1998 | Vulcan et al. | 379/114 |
| 5,917,897 A | 6/1999 | Johnson et al. | 379/114 |
| 5,917,902 A | 6/1999 | Saucier | 379/242 |
| 5,943,657 A | 8/1999 | Freestone et al. | 705/400 |
| 5,966,427 A | 10/1999 | Shaffer et al. | 379/1 |
| 6,005,925 A | 12/1999 | Johnson et al. | 379/112 |
| 6,005,926 A | 12/1999 | Mashinsky | 379/114 |
| 6,049,531 A | 4/2000 | Roy | 370/260 |
| 6,128,304 A | 10/2000 | Gardell et al. | 370/401 |
| 6,178,510 B1 | 1/2001 | O'Connor et al. | 713/201 |
| 6,205,211 B1 | 3/2001 | Thomas et al. | 379/114 |
| 6,229,804 B1 | 5/2001 | Mortsolf et al. | 370/352 |
| 6,240,449 B1 | 5/2001 | Nadeau | 709/223 |
| 6,345,090 B1 * | 2/2002 | Walker et al. | 379/114.12 |

FOREIGN PATENT DOCUMENTS

| | | |
|---|---|---|
| WO | WO 98/36543 | 8/1998 |
| WO | WO 99/14931 | 3/1999 |
| WO | WO 99/14932 | 3/1999 |

OTHER PUBLICATIONS

Rudkin, et al., "Real–time applications on the Internet," BT Technology Journal, vol. 15, No. 2, Apr. 1997, pp. 209–225.

The Ascend Max Voice Gateway, XP–002096239, "The asnet pipeline," www.asnet.co.nz/pipeline/sum97/tam-vg.html, Mar. 11, 1999.

Hansson, et al., "Phone Doubler—A step towards integrated Internet and telephone communities," Ericsson Review No. 4, 1997, pp. 142–151.

* cited by examiner

FIG.12

Main Menu > Call Pricing Center > View/Create Rate Plan

Currently Defined Rate Plans for Origination:

| Rate Plan Name | Currency | Weekly Schedules | Rate Plan Effective Date (Midnight Device Local Time) | Options |
|---|---|---|---|---|
| orig plan | US Dollar | default schedule | 10/18/00 12:00 AM | Modify Delete Supercede |
| plan 2 | US Dollar | schedule 2 | 11/17/01 12:00 AM | Modify Delete Supercede |

New Rate Plan

| Rate Plan Name | Currency | Weekly Schedules | Rate Plan Effective Date (Midnight Device Local Time) | Options |
|---|---|---|---|---|
|  | US Dollar ▽ | [Select a schedule...] ▽ | [Select a date...] ▽ -- ▽ -- ▽ | New Rate Plan |

FIG.13

| Rate Plan Name | plan 2 | | | Update information |
|---|---|---|---|---|
| Currency | US Dollar | | | |
| Weekly Schedule | schedule 2 ▽ —1330 | | | |
| Rate Plan Effective Date (Midnight Device Local Time) | November ▽ | 17 ▽ | 2001 ▽ | |

Instructions
Enter the most you are willing to pay per minute (in the selected currency) for a call initiating in the specified time period. —1365

| Time Periods | Rates —1370 | Allow termination during this period —1375 |
|---|---|---|
| [The rest of the week] | 7 —1380 | ✓ —1385 |
| thurs | 7 —1380 | ✓ —1385 |
| 2 | 7 —1380 | ✓ —1385 |

Submit Rate Plan —1390    Reset Form

TransNexus: Assign Rate Plans to IP Telephony Devices - Netscape

File Edit View Go Communicator Help

Main Menu > Call Pricing Center

Help | Log Out

Currently Assigned IP Telephony Devices for Origination

| IP Telephony Device Name | IP Telephony Device Status | Called Number Map | Assignment Effective Date (Midnight Device Local Time) | | | |
|---|---|---|---|---|---|---|
| dev1 | New | test map | 7/17/01 12:00 AM UTC | Modify | Supercede | Delete |
| dev2 | New | test map | 10/17/00 12:00 AM UTC | Modify | Supercede | Delete |

New IP Telephony Device Assignment

| IP Telephony Device Name | IP Telephony Device Status | Called Number Map | Assignment Effective Date (Midnight Device Local Time) |
|---|---|---|---|
| device 2000 | Ready | [Select a Called Number Map...] ▽ | [Select a date...] ▽ -- ▽ -- ▽ |

New IP Teleph

Document Done

FIG. 16

| Called Number Ranges | Rate Plans | Maximum Delay (ms) 1620 Voice Traffic | Routing Priority | Allow origination to this location |
|---|---|---|---|---|
| 1 -- 404 | orig plan | 200 | ○ Least cost<br>○ Least delay<br>● Same autonomous system | ☑ |
| 1 -- North America/Caribbean | plan 2 | 500 | ○ Least cost<br>○ Least delay<br>● Same autonomous system | ☑ |
| | | | ● Least cost<br>○ Least | |

PRICING CENTER FOR INTERNET PROTOCOL ROUTED TRANSACTIONS

RELATED APPLICATIONS

The present application is a continuation application of U.S. application Ser. No. 09/366,984, filed Aug. 4, 1999, now U.S. Pat. No. 6,205,211, entitled "Internet Telephony Call Pricing Center," which claims priority to provisional patent application entitled "Call Pricing Center," filed on Aug. 4, 1998 and assigned U.S. application Ser. No. 60/095,324. The disclosure of U.S. application Ser. No. 09/366,984 is fully incorporated herein by reference. The present application is also related to the following pending applications, the disclosures of which are herein incorporated by reference in their entirety, "Gatekeeper for Internet Clearinghouse Communications System" filed on Sep. 16, 1998 and assigned U.S. application Ser. No. 60/059,087, and "Internet Telephony Call Routing Engine" filed on Sep. 16, 1998 and assigned U.S. application Ser. No. 09/154,564.

TECHNICAL FIELD

The present invention generally relates to routing Internet Protocol (IP) communications. More particularly, the present invention relates to specifying call rates, schedules for when call rates apply and other preferences that assist in the routing of IP communications from an originating gateway to a terminating gateway.

BACKGROUND OF THE INVENTION

As an alternative to traditional switched circuit networks, telecommunications service providers have discovered that telephone calls may be routed over IP networks. Due to the fact that the Internet is not presently subject to the same international regulations as are traditional telephone networks, routing telephone calls over the Internet tends to be less expensive. Additionally, an IP routed telephone call requires much less bandwidth, and thus less cost, than a telephone call placed over a traditional telephone network. Further, IP technology advances and is entered into the marketplace at a much faster rate than traditional telecom technology. Thus, in order to be competitive, telecommunications service providers have begun to use IP routing as a way to offer customers access to the latest technological improvements.

Presently, however, there is no centralized system for routing telephone calls over an IP network. Each operator of a gateway is responsible for determining the routes for its own outgoing calls. Typically, gateway operators rely on traditional IP routing algorithms, which are designed to handle routing of computer generated data packets. Traditional IP routing algorithms attempt to strike a balance between the concerns of minimum delay and maximum reliability. Thus, using traditional IP routing algorithms, a telephone call will be routed to any terminating gateway that happens to satisfy a set of predetermined shortest path and acceptable data loss parameters.

The routing of telephone calls, however, involves a significant concern that is not shared by traditional IP routing algorithms. This additional concern is the monetary cost of routing a call to a particular terminating gateway. As in traditional switched circuit networks, Internet telephony gateways impose fees for the service of terminating a call. Traditional IP routing algorithms are not able to detect and compare the varying price schedules that may be imposed by various Internet telephony gateways. Thus, originating gateways are not able to discriminate between terminating gateways based on monetary costs.

One way a gateway operator can establish the costs for IP telephony services is by negotiating directly with other gateway operators the fees for terminating each other's calls. These gateway operators could identify each other and establish a bilateral agreement or a multilateral agreement. This approach closely resembles that of the international circuit switched telephony network, where providers in each country have established bilateral and multilateral agreements with each other. A significant hurdle for this routing implementation, however, is the large number of business relationships that must be negotiated and maintained. For example, should 1000 local operators decide to interconnect via bilateral agreements, 999000 separate agreements would be necessary. Interconnection through a centralized system, however, would require only 1000 separate business agreements, each with a separate operator.

Another disadvantage with the bilateral agreement model is that the gateway operators are not able to react quickly and intelligently to changing market forces because the bilateral agreements are generally long term contracts. For example, when there is a sudden increase in demand for terminating calls to a particular area the gateway operator in that area is unable to increase his terminating charges and take advantage of the demand. Additionally, the bilateral agreement model or the multilateral agreement model are too cumbersome for the gateway operators to set call pricing based on selected called number ranges (any given subset of all possible telephone numbers). This is especially true if the total number of telephone numbers comprising a called number range is too small. For example, it may be too cumbersome for the gateway operators to negotiate a specific call pricing plan for a specific customer with less than one hundred numbers within their called number range.

Thus, there remains a need in the art for a method and system by which an originating gateway operator may set a price that it is willing to pay to a terminating gateway operator for the service of terminating a call. There is also a need for a method and system by which a terminating gateway operator may set a price that it is willing to accept in exchange for terminating a call. There is a further need for a method and system configured for use by an IP routing engine for selecting routing options for a call based on matching the pricing criteria set by the originating and the terminating gateway operators.

There also remains a need in the art for a method and system by which a gateway operator may set or change call pricing criteria on-demand. There also remains a need in the art for a method and system by which a gateway operator may set or change call pricing criteria associated with any subset of all possible telephone numbers.

SUMMARY OF THE INVENTION

The present invention provides a method and system for defining pricing information to be used by a call routing engine for the purpose of determining a preferred route for routing IP transactions between network devices, such as telephony calls from an originating device to a terminating device via an IP network. A call pricing center of the present invention is a web-based user interface that may be designed for use by both IP bandwidth providers (partners) and their customers (retail IP service providers). The call pricing center enables its users to enter information about their preferences including pricing criteria. For example, this information can be used by a IP call routing engine to provide the originating gateway operators with a prioritized list of terminating gateways whose pricing criteria match those set by the originating gateway operators. The originating customers enter information relating to call prices they are willing pay for calls to particular called numbers at particular times. Originating customers may also specify pricing criteria, which defines the circumstances in which a call price is to be applied. Similarly the terminating customers enter information about the call prices they charge for terminating calls to particular numbers at particular times. Terminating customers may also specify pricing criteria of their own. Call pricing information generally describes call prices as well as pricing criteria.

Call pricing information is but one example of preferences and preference criteria that may be defined for the purpose of determining call routing priorities. Other preferences include, but are not limited to, delay tolerance and expected reliability. Any preferences and preference criteria entered via the call pricing center may be stored in a database that is accessible by a call routing engine. When a customer initiates a call, the originating gateway operator requests that the service point operator provide it with routing information necessary to terminate the call. Using call pricing information (i.e., call prices and pricing criteria) and other preferences and preference criteria defined via the call pricing center, the call routing engine associated with the service point operator determines the routing information corresponding to the most appropriate terminating gateways. A prioritized list of terminating gateways is then provided to the originating gateway. When provided with this prioritized routing information, the originating gateway may complete the call by choosing to terminate the call via any one of the appropriate terminating gateways.

The users define the pricing criteria by creating various components which are then assembled to define what rates are preferred to what numbers at what times by both the originating and terminating customers. The users can begin by first creating a weekly schedule comprising at least one time period to which a selected rate for terminating a call is to be applied. The weekly schedule corresponds to a week with 168 available hours. The weekly schedule is created by defining time periods that include a selection of the available hours within a week to which a certain rate can be applied. The users then have to create a called number map comprising at least one called number range to which a selected rate plan instance is to be applied. A called number range can be created by selecting the at least one called number from a list of all possible called numbers in the world. The customer can then apply a rate plan instance to the called number range. The rate plan instance is created by selecting a weekly schedule and then associating a rate with each time period included within the weekly schedule. The weekly schedule and called number maps that are created can then be used to assemble pricing criteria for both terminating and originating customers. However, the rate plan instance itself is either a originating one or a terminating one. Once a rate plan instance is in place the customer can then create a rate plan assignment instance by associating at least one device with the called number map and associating a rate plan instance with each called number range included in the called number map. In this manner the customer can define what rate plans apply to what devices and what devices route calls to what called numbers. The customer also has the ability to define when the rate plan instances and the rate plan assignment instances go into effect. This in turn allows the customer to define the rates that apply to particular called numbers at particular times.

Besides the preferences related to prices the customers can also define other preferences related to maximum delay they are willing to tolerate, any related to autonomous system matching and maximum system hop count. In this manner the originating customers have the option of further narrowing the available terminating customers to choose from to terminate their call. Thus the call pricing center of the present invention provides its users a method by which to create components such as the weekly schedules and called number maps which can be used or reassigned to different rates and different devices without having to recreate all the components. This provides the users a significant advantage in time and allows the users to change their preferences in reaction to market changes. The call pricing center is also unique in its granularity in allowing its users to dictate their preferences down to a single telephone number and to a single unit in time.

BRIEF DESCRIPTION OF THE DRAWINGS

FIG. 12 shows an exemplary screen display of an illustrative View/create Rate Plan window.

FIG. 13 shows an exemplary screen display of an illustrative Edit Rate Plan window.

FIG. 15 shows an exemplary screen display of an illustrative View/create Rate Plan Assignment window.

FIG. 16 shows an exemplary screen display of an illustrative Edit Rate Plan Assignment window.

DETAILED DESCRIPTION OF THE EXEMPLARY EMBODIMENTS

The present invention is referred to herein as a Call Pricing Center. The present Call Pricing Center provides a system and method for setting preferences, such as pricing criteria, which are to be used by a routing engine for routing IP transactions among network devices, such as telephony calls from a originating gateway to a terminating gateway via an IP network. A telephone call occurring via an IP network is often referred to as a "voice over IP" transaction. When a "voice over IP" transaction specifically involves the Internet, the description "Internet telephony" may also used to describe the transaction. An exemplary embodiment of the present invention will be described herein with respect to Internet telephony. However, the principles of the Call Pricing Center of the present invention apply to all IP routed transactions, including but not limited to, "voice over IP" calls, "fax over IP" calls, and "video over IP calls."

Exemplary Operating Environment

Figure 1:
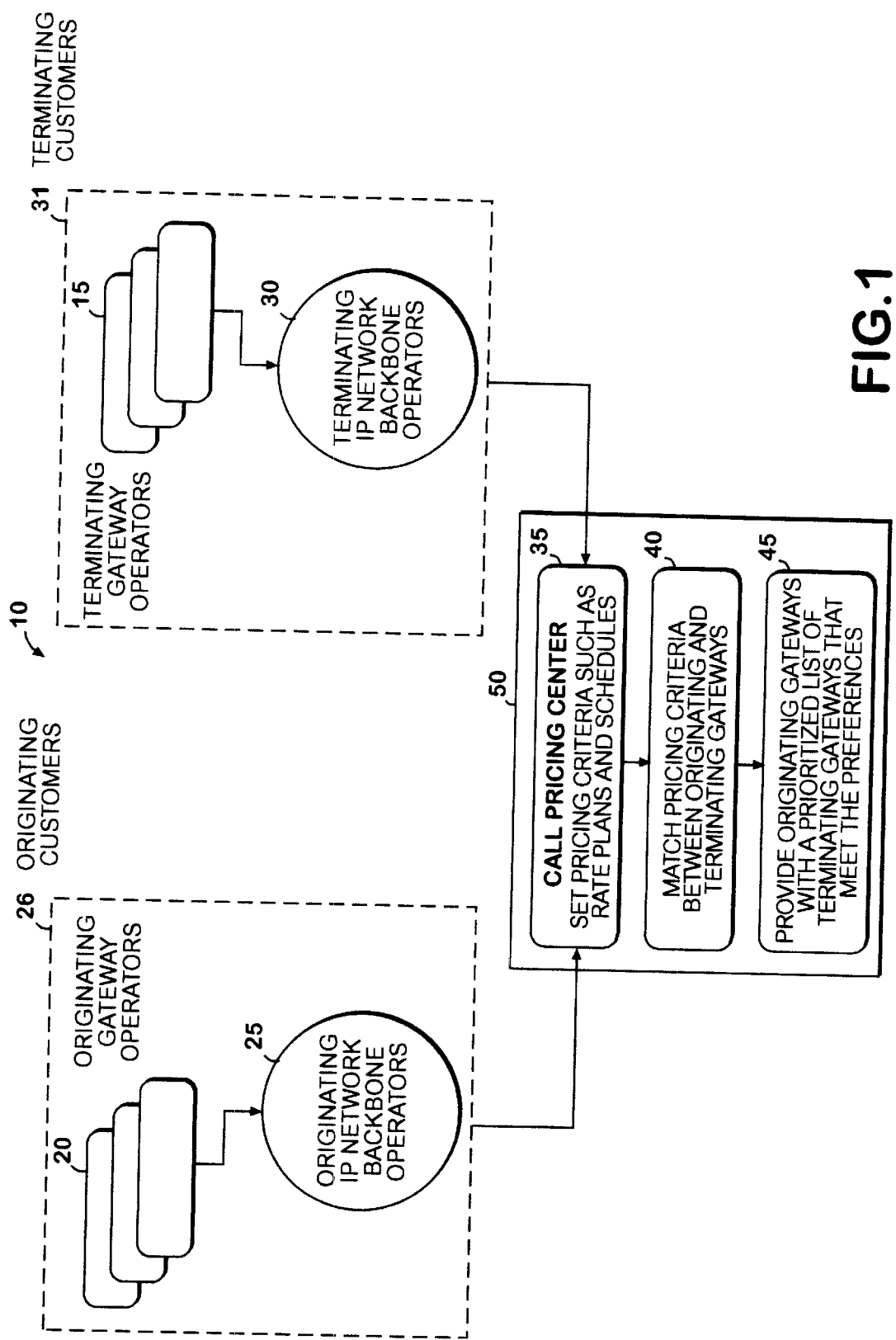
FIG. 1 is a flowchart showing an overview of a method of determining a preferred route for completing an Internet Protocol routed transaction using an exemplary call pricing center of the present invention.

The following description of an exemplary operating environment and exemplary embodiments of the present invention will refer to the drawing, in which like numerals indicate like parts throughout the several figures. Referring thereto, FIG. 1 shows an overview 10 of a method of determining a preferred route for completing an Internet Protocol routed transaction, such as a telephony call using a call pricing center 35 of the present invention. The originating gateway operators 20 represent the retail IP telephony service providers who set the price charged for a call placed by a telephone user. The originating IP network backbone operators 25 represent wholesale IP bandwidth providers who have agreements with the originating gateway operators 20 to provide the bandwidth and switching necessary to route the telephone call.

Similarly the terminating gateway operators 15 represent the retail IP telephony service providers who set the price for terminating a call placed by a telephone user. The terminating IP network backbone operators 30 represent wholesale IP bandwidth providers who have agreements with the terminating gateway operators 15 to provide the bandwidth and switching necessary to terminate a telephone call. Those skilled in the art will recognize that a gateway operator has the capacity to serve as a gateway for both originating and terminating telephone calls. In fact originating gateway operators 20 and terminating gateway operators 15 typically differ only in the role played in a particular call. Similarly, backbone operators can handle both originating and terminating telephone calls. In fact, originating backbone operators 25 and terminating backbone operators 30 typically differ only in the role played in a particular call. Henceforth both a originating IP backbone operator 25 and a originating gateway operator 20 may collectively, or in the alternative, be referred to as originating customers 26. Similarly, a terminating IP backbone operator 30 and a terminating gateway operator 15 will collectively, or in the alternative, be referred to as terminating customers 31.

The Call Pricing Center (CPC) 35 of the present invention allows an originating customer 26 to define preferences, such as rates that it is willing to pay for calls placed to particular called numbers at particular times. Similarly, the CPC 353 allows a terminating customer 31 to define preferences, such as rates it will charge for terminating calls to particular called numbers at particular times. Information relating to the rates that an originating customer 26 is willing to pay may also be referred as a 'bid'. Information relating to rates that a terminating customer 36 will charge for terminating calls may be referred as an 'ask'. Henceforth, a bid price and an ask price collectively or in the alternative may be referred to as call prices.

Besides call prices, the preferences defined by a customer may also relate, for example, to call delay and reliability. An exemplary embodiment of the present Call Pricing Center may also allow customers to define circumstances in which preferences are to be applied. For example, a customer may define preferences that relate to call prices. The customer may also specify that the call prices are to apply to calls made at certain times of the day, after a certain date and/or to certain called telephone numbers. Such criteria defining when preferences are to be applied are referred to herein as preference criteria. In the case where the preference in question is a call price, the preference criteria may be referred to as pricing criteria. Henceforth, the detailed description refers to pricing criteria in describing exemplary embodiments of the present invention. However, it should be understood that pricing criteria is just one example of preference criteria that may be used in accordance with the present invention to match originating customers with terminating customers.

As shown in FIG. 1, the exemplary Call Pricing Center 35 may comprise a component of a system referred to herein as a clearinghouse 50. A clearinghouse 50 is configured to accept preferences and preference criteria, such as rate plans and schedules, from originating customers 26 and terminating customers 31, via the CPC 35 (see FIG. 1, step 36). A clearinghouse 50 also includes functionality, which will be described below, for utilizing preference criteria in order to match an originating customer's request to terminate a call with one or more terminating customers 31 who are available to terminate the call and whose pricing criteria and other preference criteria match those defined by the originating customer 26 (see FIG. 1, step 40). The matching described in step 40 may be performed in real time because both the originating customers 26 and the terminating customers 31 may change their respective call prices and price criteria via the CPC 35 whenever they so desire. As shown, a clearinghouse 50 may further be configured to send to originating customers 26 a prioritized list of available terminating customers 31 (see FIG. 1, step 45).

Figure 2:
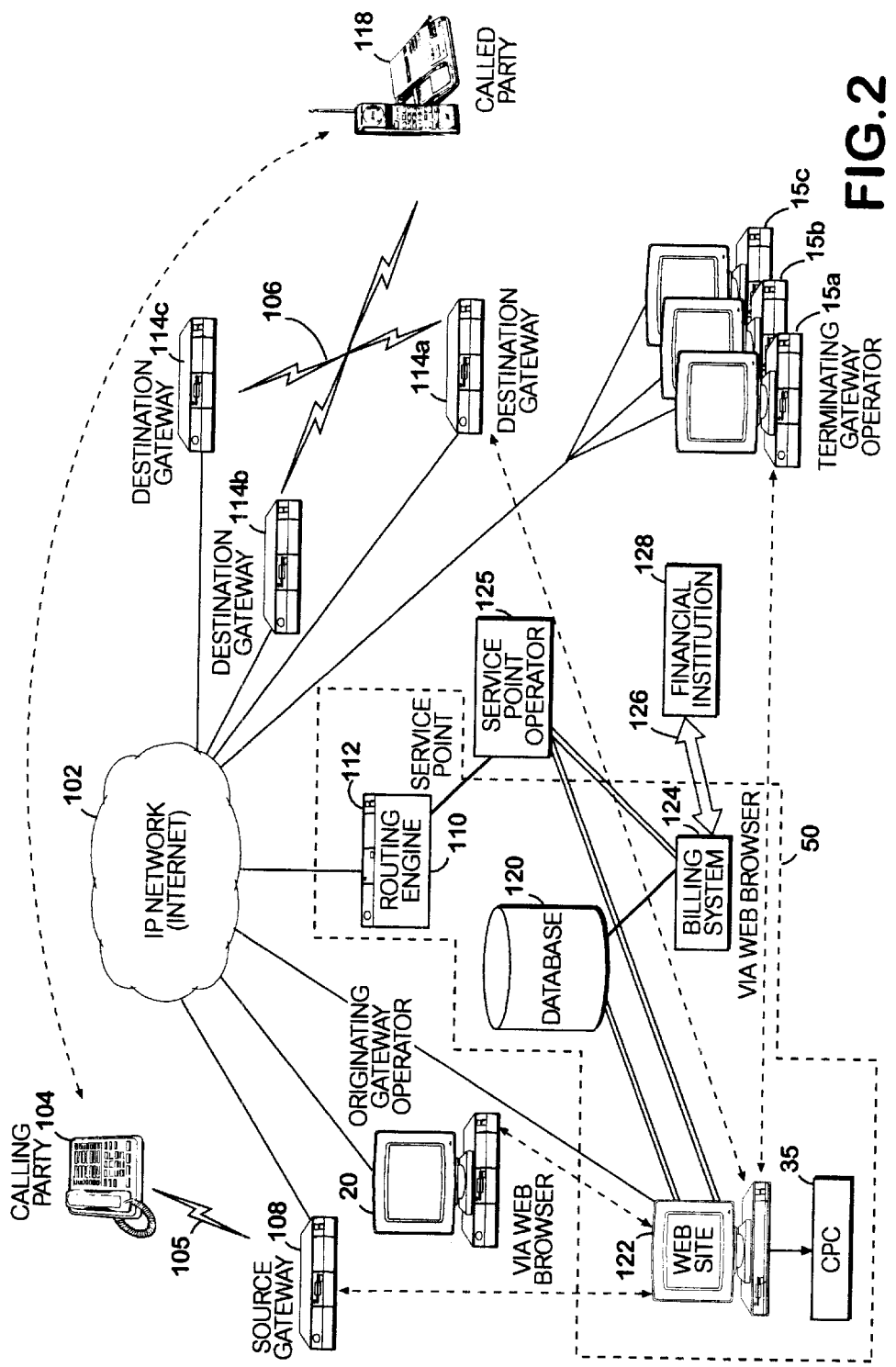
FIG. 2 illustrates a network architecture that serves as an exemplary operating environment for a call pricing center in accordance with the present invention.

Referring thereto, FIG. 2 shows a network architecture that serves as an exemplary operating environment for determining a preferred route for completing an Internet telephony call based on matching the pricing criteria between originating customers 26 and terminating customers 31, using an exemplary call pricing center 35 of the present invention. As indicated, an IP network 102, such as the Internet, serves as the heart of the exemplary network architecture. Relying on the IP network 102 are six different systems that might participate in an Internet telephony transaction. These six systems include: a calling party 104, a source gateway (also referred to as an originating gateway) 108, a service point 112 including a routing engine 110, a call pricing center 35 accessible via a web site 122, a destination gateway (also referred to as a terminating gateway) 114 and a called party 118. As FIG. 2 shows, a service point 112 is coupled to a central database 120, which is also coupled to a billing and settlement system 124 and a web site 122. The web site 122 is also coupled to the database 120. While the service point 112 and the web site 122 are accessible via the IP network 102, the central database 120 and the billing and settlement system 124 preferably remain in secured facilities. Private communication paths may connect the remote equipment with the central database 120.

The calling party 104 represents the user wishing to place a telephone call. Often, the calling party 104 will rely on a standard telephone handset to place the call. In fact, in many cases the calling party 104 may not be able to distinguish Internet telephony service from standard telephone service.

The calling party 104 connects to an originating gateway 108 through a public telephone network 105, such as a switched circuit network. In either case, the originating gateway 108 serves as a bridge between ordinary telephones and the IP network 102 by converting telephone signals into data packets (and vice versa) and transmitting the data packets over the IP network 102. A originating gateway is operated by a originating gateway operator 20.

Similarly, the called party 118 is the user that receives a telephone call. A called party 118 connects to terminating gateways 114 through a public telephone network 106, such as a switched circuit network. A terminating gateway 114 is connected to the IP network 102 at a location that is remote from the originating gateway 108. The terminating gateway 114 is operated by a terminating gateway operator 15 and performs the same functions as the originating gateway 108, i.e., bridging phone calls between the IP network 102 and a public telephone network 106, or an equivalent thereof. Terminating gateways 114 differ from originating gateways 108 only in the role played in a particular call. In particular, originating gateways 108 act on behalf of the calling party 104, while terminating gateways 114 act on behalf of the called party 118. It is important to note that the same operator need not manage both the originating gateway 108 and the terminating gateway 114. In fact, the CPC 35 of the present invention is particularly tailored for environments in which different owners operate the two types of gateways.

As indicated in FIG. 2, a clearinghouse 50 may comprise the components of a service point 112 (including a routing engine 110), a database 120, a web-site hosting a CPC 35, a billing and settlement system 124. A service point operator 125 may be responsible for maintaining the clearinghouse 50. A service point operator 125 may be a third party that is independent of the originating gateway operator 20 or the terminating gateways operator 15. As shown in FIG. 2, the service point operator 125 may maintain a private communications line with the service point 112, the billing and settlement system 124 and the web-site 122. In the exemplary operating environment, all components maintained by the service point operator 125 are conveniently distributed between various geographic locations. Still, those skilled in art will appreciate that all components maintained by the service point operator 125 may be incorporated in a single system or any number of distributed systems. As mentioned, a clearinghouse 50 may be configured to provide an originating gateway 108 with routing information relating to those terminating customers 31 who match the call prices and pricing criteria (and other preferences and preference criteria) set by the originating customers 26. A service point 112 communicates with gateways over the IP network 102 and generally provides routing information to an originating gateway 108. Given a terminating phone number (also referred to as a 'called number') and preferences (described in detail below), the service point 112, through the routing engine 110, identifies at least one appropriate terminating gateway 114 to handle the call. The service point 112 is coupled to the web site 122, which hosts the call pricing center (CPC) 35. The function of the call pricing center 35 is to provide a system by which originating customers 26 and terminating customers 31 may enter their respective call prices and pricing criteria to be used by the routing engine 110 in order to provide routing information to the originating gateways based on the best matches for their preferences and preference criteria. As mentioned, call prices are but one example of preferences that may be defined by an originating gateway operator 20. Other preferences may relate, for example, to delay tolerance and expected reliability. The routing engine 110 may be configured to use the preferences set by the originating gateway operator 20 as filters for eliminating potential terminating gateways and determining the most appropriate terminating gateway to terminate a call. An originating gateway operator 20 may specify none or any combination of preferences as its filters. Also, an originating gateway operator 20 or a service point operator 125 may specify the maximum number of call routes that are to be returned by the routing engine 110 in response to a call authorization request.

In an exemplary embodiment, a first preference referred to herein as a bid is defined as "the maximum rate the originating gateway operator is willing to pay for a call to a specific telephone number."

All terminating gateways 114 charging rates (the ask) that are greater than the bid are eliminated from the search for the optimal call route. The bid may be specified as a function of time of day, day of the week and/or destination. Call prices (bids and asks) may be expressed in any type of currency and any fraction thereof.

Another preference in the exemplary embodiment may be defined as "the maximum delay than an originating gateway operator 20 is willing to tolerate." The maximum delay is preferably the overall network delay, which is measured by the time taken for a signal to travel between the calling party 104 and the called party 118. The lower the network delay from when the calling party 104 speaks to when the called party 118 hears the words, the higher the quality of the conversation. Those skilled in the art will appreciate that there are many other factors that determine delay or latency in a voice telephone call. Other examples of delay include: delay due to interlocking of a digital conversation, buffering delays inside gateways, delays on public switched telephone networks (PSTN), etc. It is contemplated that such other sources of delay may be factored into the "maximum delay preference." However, it is expected that network delay will be the most significant contributor to the overall quality of an Internet telephony call. Thus, in the exemplary embodiment, other sources of delay are ignored.

Another preference defined in the exemplary embodiment is the "maximum autonomous system (AS) hop count that the originating gateway operator will tolerate." The IP network 102 may comprise a collection of "autonomous" IP networks. Thus, a voice signal traveling from a originating gateway 108 to a terminating gateway 114 may traverse one or more autonomous systems. The fewer autonomous systems that a signal must traverse, the lower the network delay should be. While it is not necessarily true that a lower AS hop count will lead to lower delay, AS hop count does provide a good estimation of network delay. Furthermore, a lower AS hop count tends to suggest that there will be less signal loss (packet loss) when the voice signal reaches its destination.

A determination of AS hop count is instantaneous and may be derived from information relating to the dynamic topology of the IP network 102, which is dictated by congestion, etc., that is continuously gathered and stored in the database 120. To the contrary, network delay may only be determined by actual measurement, as described above, which involves significantly more time than an AS hop count calculation. Therefore, an originating gateway operator 20 may elect to use the AS hop count preference, rather than the "maximum delay" preference.

An additional preference may be defined as "autonomous system (AS) matching," which dictates that, whenever possible, a route should be chosen such that both the originating gateway 108 and the terminating gateway 114 are on the same AS. A determination of AS matching is similar to a determination of AS hop count. A determination of AS matching dictates that given the choice of an AS hop count of zero and any other AS hop count, the route having the AS hop count of zero will be chosen. Similarly, "domain matching" and "platform matching" preferences may be defined, such that no terminating gateway 114 that operates in a specified domain or on a specified platform will be selected to terminate a call.

Of course, an originating gateway operator 20 may set as many or as few preferences as it would like. It is contemplated that preferences other than the exemplary preferences described herein may be implemented. For example, the originating gateway operator 20 may also set preferences defining that all terminating gateways 114 that are not interoperable with the originating gateway 108, or do not offer the requested type of service, i.e. voice or fax, are to be eliminated from consideration. Other preferences may include, but are not limited to: "historical availability," which eliminates from consideration all terminating gateways 114 that have historical availability less than the required availability specified by the originating gateway operator 20; "preferred operator," which eliminates from consideration all terminating gateways 114 that are not operated by a preferred operator specified by the originating gateway operator 20; "packet loss," which eliminates from consideration all terminating gateways 114 whose historical packet loss is greater than the minimum specified by the originating gateway operator 20; "latency," which eliminates from consideration all terminating gateways 114 whose historical packet loss is greater than the maximum latency specified by the originating gateway operator 20; "quality of service (QoS) score," which eliminates from consideration all terminating gateways 114 whose QoS is less than the minimum specified by the originating gateway operator 20; "RSVP preference," which eliminates from consideration all terminating gateways 114 that cannot support, or are on networks that do not support, bandwidth reservation; and "best worst case," which eliminates from consideration all terminating gateways 114 whose best worst case scenario for packet loss and latency exceeds the minimum best worst case scenario specified by the originating gateway operator 20. The best worst case is estimated by summing the packet loss or latency between the originating gateway 20 and a reference point maintained by the service point operator 125 (SPref) plus the latency and packet loss between the terminating gateway 114 and SPref. For example, the worst case for packet latency between a originating gateway 108 and a terminating gateway 114 is assumed to be equal to packet latency between the originating gateway 108 and SPref+ terminating gateway and SPref.

Preferences may also be ranked by the originating gateway operator 20, such that one type of preference is given more weight by the routing engine 110 when eligible terminating gateways 114 are prioritized. A predetermined system for ranking preferences is useful when the routing engine 110 locates more than one terminating gateway 114 that satisfies all preferences. Thus, a ranking system may be used as a "tie breaker." An originating gateway operator 20 may prioritize its preferences in any order, or in no order at all. Preferences may be ranked by least cost. By way of example, a preference designated by a originating gateway operator 20 may dictate that the maximum price the originating gateway operator 20 is willing to pay for a call to London is $0.40/minute. The routing engine 110 may locate two eligible terminating gateways 114a–b to terminate the call; one terminating gateway 114a charging $0.35/minute and the other terminating gateway 114b charging $0.30/minute. Both terminating gateways 114a–b are eligible because they each meet the preference designated by the originating gateway operator 20. However, the originating gateway operator 20 may also specify that all eligible terminating gateways 114a–b are to be ranked (or sorted) by least cost. Thus, the terminating gateway 114b charging $0.30/minute will be assigned a higher priority than the terminating gateway 114a charging $0.35/minute. Preferences may also be ranked by AS matching, such that priority is given to routes involving gateways on the same autonomous system. Also, preferences may be ranked by subscriber (intra-domain)matching, such that priority is given to routes involving terminating gateways 114 connected to the same network as the originating gateway 20. Intra-domain routing may be predefined to take first priority even if price and quality of service are inferior to other gateways.

Preferred platform matching allows a originating gateway operator 20 to prioritize its preferred terminating gateway platform for termination. For example, Lucent and VocalTec gateways may be interoperable; however, an originating gateway operator 20 who has deployed Lucent gateways might prioritize that calls be routed to Lucent gateways as a first choice. Or the originating gateway operator 20 might specify that VocalTec gateways be eliminated as a possible terminating gateways, even though they are compatible and are the best match for the originating gateway operator's 20 other routing criteria.

Preferences may also be ranked based on minimum AS hop count. Priority may be given to BGP query route calls to terminating gateways 114 that can be reached with the fewest autonomous system hops. Preferences may also be ranked based on historical records of availability (as a function of day of week and time of day). Priority may thus be given to terminating gateways 114 with the best historical availability or eliminate those gateways with historical availability less than the minimum required by the originating gateway operator 20.

Further, to support implementation of bilateral agreements, a service point operator 125 may allow originating gateway operators 20 to prioritize their preferred terminating gateway operators 15 for termination. For example, an originating gateway operator 20 may specify that a terminating gateway operator 15b is always its first choice and terminating gateway operator 115c is its second choice for termination, even if other terminating gateways are a better fit for the originating gateways operator's 20 routing criteria. Similarly, a originating gateway operator 20 may prioritize specific individual terminating gateways 114 as its preferred termination points for a call to a called number string.

Based on historical records of packet loss between an originating gateway 108 and potential terminating gateways 114 (possibly as a function of day of week and time of day), priority may be assigned based on lowest historical packet loss. In a similar manner, priority of routing may be assigned based on the lowest historical packet latency between the originating gateway 108 and potential terminating gateways 114 (possibly as a function of day of week and time of day). Further, ranking of potential terminating gateways 114 may be based on other preference, such as: QoS scoring, by using historical data of packet loss, latency and availability with codec and gateway implementation choices to make best terminating gateway 114 selection; RSVP, by routing calls based on which call path offers the required bandwidth reservation at the lowest price; and "best worst case," by routing calls based on the best worst case scenario described above. In the absence of any ranking or sorting scheme specified by a originating gateway operator 20, the routing engine 110 may either employ its own ranking scheme, or in the interest of impartiality, randomly prioritize the eligible terminating gateways 114.

The overall network architecture shown in FIG. 2, which serves as an operating environment for an exemplary CPC 35, may be thought of as comprising three different networks, each carrying the telephone conversation. The first network is the calling party's telephone network 105 that connects the calling party to the originating gateway 108. The second network is the IP network 102, which connects the originating gateway 108 and the terminating gateway 114 to each other. The third network is the called party's telephone network 106, which completes the connection from the terminating gateway 114 to the called party 118. The various networks that connect to form the IP network 102 are typically owned and operated by the backbone operators 25 and 30 (see FIG. 1), who in turn lease or sell IP bandwidth capacity to the gateway operators 20 and 15. It should be noted that backbone operators may also serve as gateway operators. Although FIG. 1 (as well as this description in general) refers to the telephone connections as taking place through public telephone networks 105 and 106, Internet telephony service does not require such a connection. Some applications may use private networks, such as those provided by a private branch exchange; others may simply connect telephone handsets directly to the corresponding gateway.

Additionally, a fourth network may be added to the general network architecture. The fourth network is a banking and funds transfer network 126. A billing and settlement system 124 may be coupled to the service point 112 and the call pricing center 35 via the web site 122 in order to receive information relating to the financial aspects of the Internet telephony transactions. The billing and settlement system 124 may use a banking and funds transfer network 126 to execute the financial transactions coordinated by the service point 112.

Figure 3:
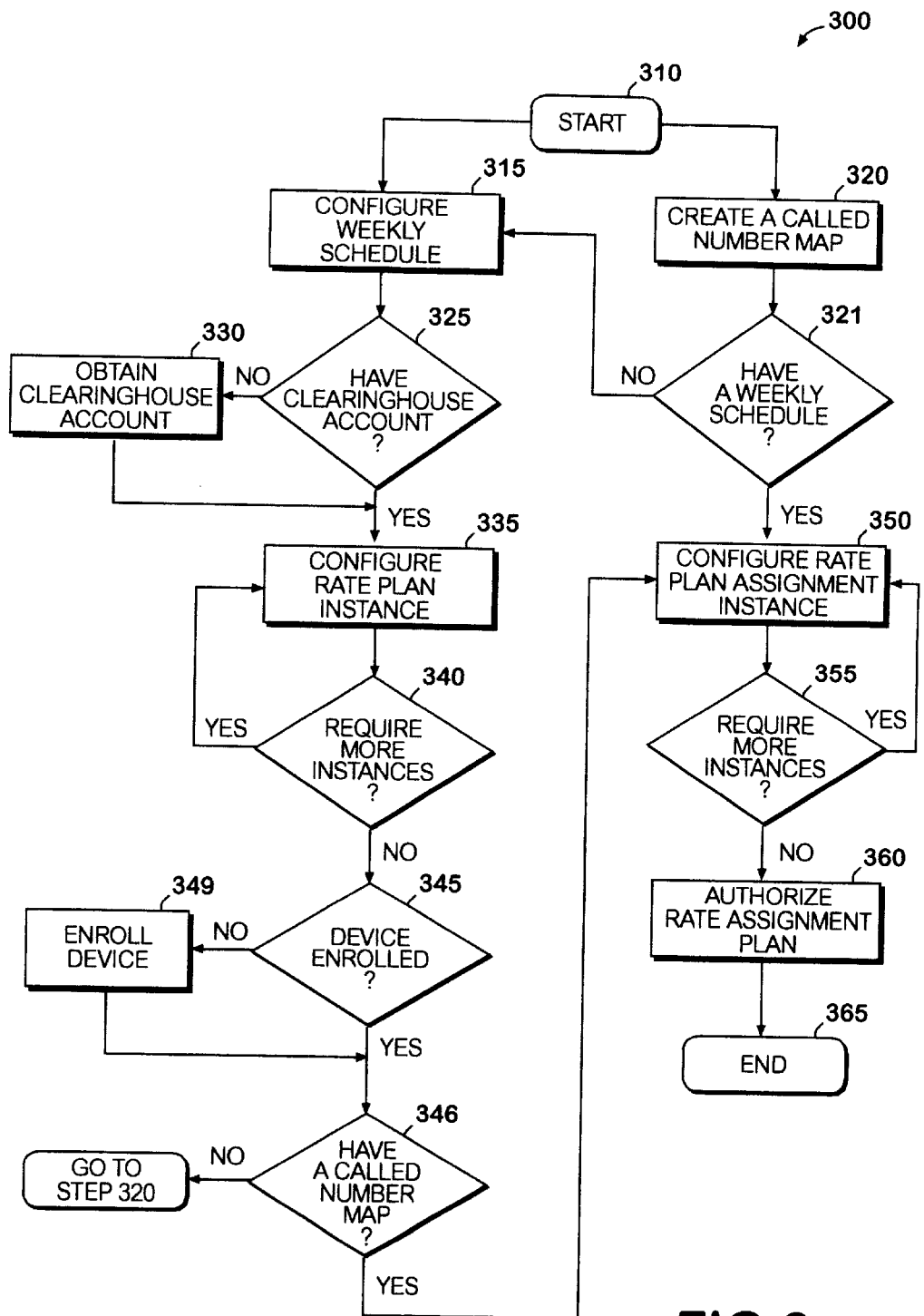
FIG. 3 is a flowchart showing an overview method for using an exemplary call pricing center to define call pricing information.
Figure 4:
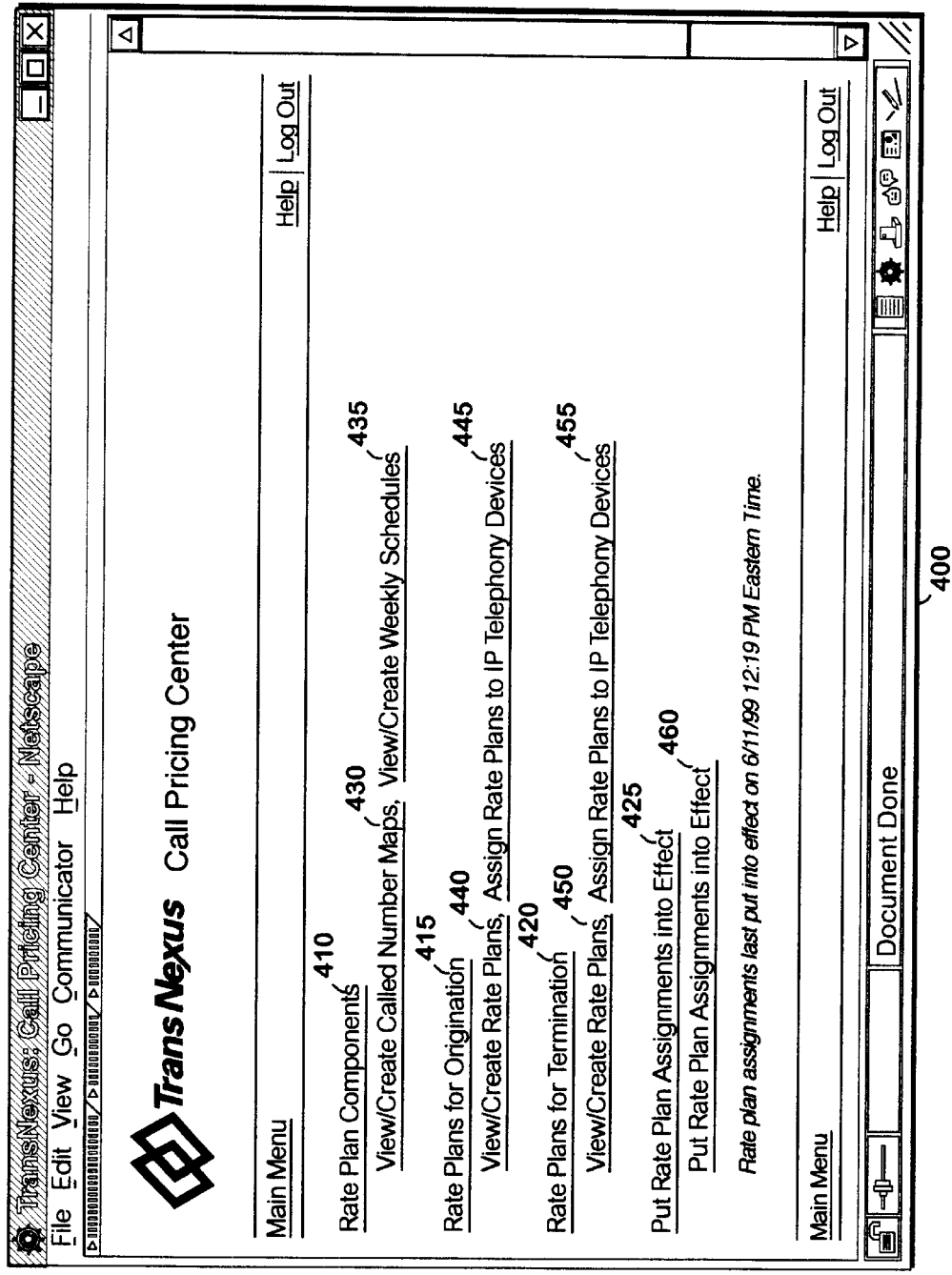
FIG. 4 shows an exemplary screen display of an illustrative Call Pricing Center window.

FIG. 3 generally describes a method by which an originating customer 26 or a terminating customer 31 may use an exemplary CPC 35 to define call prices and pricing criteria (as well as other preferences and preference criteria). As mentioned, a call price may either be a 'bid' or an 'ask.' Pricing criteria is used to specify the circumstances in which call prices are to be applied. For brevity, the term "call pricing information" is used herein to refer, collectively or alternatively, to call prices and pricing criteria. In an exemplary embodiment, a customer accesses the web site 122 hosting the CPC 35 via the IP network 102 in order to define call pricing information (see FIG. 2).

Generally, the process of defining call pricing information comprises the steps of creating one or more weekly schedules in step 315 (explained in detail below), creating one or more called number maps in step 320 (explained in detail below), creating one or more rate plans in step 335 (explained in detail below) and assigning the rate plans and the called number maps to devices in step 350 (explained in detail below). A customer may begin the process of defining call pricing information either by creating a weekly schedule in step 315 or by creating a called number map in step 320. For the sake of the following discussion only, it will be assumed that a customer begins to define call pricing information by first creating a weekly schedule at step 315.

A weekly schedule is created by dividing the hours making up a week (Sunday through Saturday) into two collections of customized time periods. Each time period comprises a collection of hours within the exemplary week. Thus a weekly schedule gives customers the ability to set different pricing for different days of a week and different times of a day. By way of example only, a customer may specify that a first call price is to be in effect during the hours of 6:00 p.m. through 10:00 p.m. on Tuesday, Thursday and Friday and that a second call price is to be in effect during all other hours of the week.

Although, the exemplary embodiment refers to a weekly schedule, those skilled in the art will recognize that such a schedule maybe created for any predetermined unit of time, such as a year, a month or a day. In general, a "time period schedule" may be created by dividing a pre-determined unit of time into collections of time periods, each of which comprise a collection of sub-units of time that make up the pre-determined unit of time. For example, a monthly schedule may be created by dividing a month into collections of time periods comprising collections of days within the month. Accordingly, a weekly schedule is but one example of a time period schedule. For the sake of clarity, the following description of the exemplary embodiments will refer only to a weekly schedule.

After a weekly schedule is created at step 315, a determination is made at step 325 as to whether the customer has previously established a customer account with the clearinghouse. If the customer has not established a customer account with clearinghouse the exemplary method 300 proceeds to step 330, where such a customer account is established with the clearinghouse. However, if the customer has in fact established a customer account with clearinghouse, then the method proceeds from step 325 to step 335 for the creation of a rate plan instance.

In step 335, the customer creates a rate plan instance by using the weekly schedule created in step 315 and assigning either a bid price (for originating customers 26) or a ask price (for terminating customers 31) to each of the time periods that combine to make up the weekly schedule. It should be appreciated that the weekly schedule created in step 315 is not specific either to a terminating customer 31 or an originating customer 26. Therefore the weekly schedule created in step 315 may be used to create both terminating and originating rate plan instances. Still, a rate plan instance itself is either an originating one or a terminating one and cannot be both. In step 335, the customer also selects a date, referred to as the "effective date," when the rate plan will become effective. Proceeding to step 340, a determination is next made as to whether the customer desired to create additional instances of the rate plan. If additional rate plan instances are desired, the method returns to step 335. However, if no additional rate plans are desired, the method proceeds to step 345, where a determination is made as to whether the customer has enrolled, with the clearinghouse 50, a device to be associated with a rate plan instance. The devices referred to in step 345 may either be originating gateways 108 or terminating gateways 114a–c (see FIG. 2).

If at step 345 it is determined that the customer has not enrolled a device with the clearinghouse, the method proceeds to step 349 for device enrollment. Once it is established that a device has been enrolled, the method proceeds to step 346, where a determination is made as to whether the customer has created at least one called number map. If the customer has created a called number map, the method may advance directly to step 350, where an enrolled device is assigned to a particular rate plan. However, if no called number map has been created (as in this example), the method moves to step 320, where such action is taken. At step 320, a called number map is created by dividing every possible called number (for example every phone number in the world) into a collection of called number ranges. A called number map gives the customer the ability to set different call pricing information for different called number ranges. A called number map, like a weekly schedule, is not necessarily specific to an originating customer 26 or a terminating customer 31. Next at step 321, a determination is made as to whether the customer has created at least one weekly schedule in step 315. If a weekly schedule has been created (as it has in this example), then the method may proceed to step 350 for configuration of a rate plan assignment instance. If no weekly plan has yet been created, the method must continue from step 315, as previously described.

In step 350 a rate plan assignment instance is created by assigning a called number map to one or more enrolled devices. Creating a rate plan assignment instance also involves assigning a rate plan to each called number range within the called number map. In addition, an "assignment effective date," indicating when the rate plan assignment instance is to become effective, may also be specified at step 350. It should be appreciated that this "assignment effective date" is distinct from the "rate plan effective date" defined in step 335. At step 355, it is determined whether the customer desires to create additional rate plan assignment instances. If so, step 350 is repeated until no additional rate plan assignment instances are desired. When the rate plan assignment, including at least one rate plans assignment instance, is completed, the method advances to step 360, where the rate plan assignment is authorized. Those skilled in the art should recognize that an authorized rate plan assignment may be stored such that it is ready to be put into effect upon the occurrence of assignment effective date. Lastly, the exemplary method 300 ends at step 365.

In summary, the exemplary method 300 described with reference to FIG. 3 includes five major steps: (1) one or more weekly schedules are created at step 315; (2) one or more called number maps are created at step 320; (3) a rate plan comprising at least one rate plan instance is created at step 355; (4) a rate plan assignment comprising at least one rate plan assignment instance, is created at step 350; and (5) the rate plan assignment is authorized at step 360. Each of these major five 10 steps, and sub-steps thereof, are described in detail below with reference to FIGS. 4–16.

Accessing the CPC via the IP Network

A customer may use any commonly known web browser, executed on any desktop computer or workstation, in order to access the web site 122 hosting the exemplary CPC 35 via the IP network 102. The computer used by the customer may be a stand-alone computer or may be part of a distributed network of computers such as, a LAN or a WAN. Those skilled in the art will appreciate that the CPC 35 may be accessed through use of any type of computer, including a PC running the "Microsoft Windows 98" operating system, an Apple computer running the "MACINTOSH" operating system or a workstation running any version of the "UNIX" operating system.

Creating Call Pricing Information

Exemplary methods for specifying call pricing information to be used by an IP routing engine to conduct a real time auction of Internet telephony services are described with reference to FIGS. 4–16. FIGS. 4–16 represent illustrative screen displays showing various aspects of an exemplary CPC 35, in accordance with the present invention. Beginning with FIG. 4, a screen display of an exemplary Call Pricing Center window 400 of the CPC 35 is shown. From this Call Pricing Center window 400, a customer may choose to begin any of the steps for creating call pricing information by clicking the various hyperlinks 430–460 located underneath the title bars 410–425. For example, by clicking on the hyperlink 430 labeled "View/Create Called Number Maps," a customer may launch a window for creating called number maps.

Figure 5:
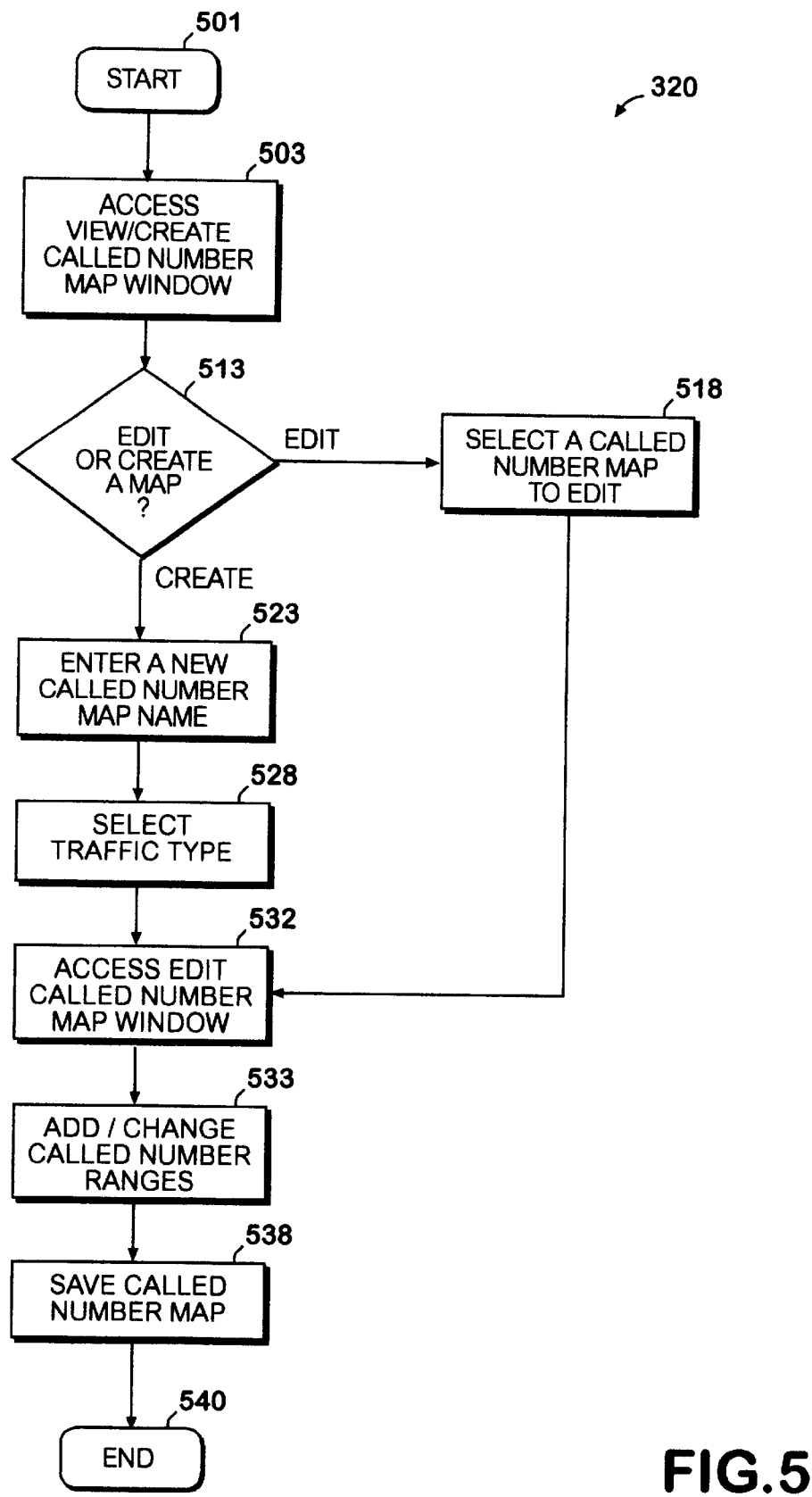
FIG. 5 is a flowchart shows the general steps involved in an exemplary method for creating and editing a called number map.

Now turning to FIGS. 5–7, an exemplary method for creating 10 a called number map will be described. An overview of an exemplary method for creating and editing a called number map will be described first with reference to FIG. 5 and later a more detailed description will be provided with reference to FIG. 6 and FIG. 7. As mentioned, a called number map is essentially a division of all possible called telephone numbers into an exhaustive set of telephone number ranges, grouped by a called number prefix. A called number prefix is a set of digits is that is common to all of the called numbers in a called number range. According to the international telecommunications standard ITU E. 164, an international telephone number consists of a one to three digit country code followed by no more than twelve additional digits. The first digit of the country code may be a digit from 1 to 9 and is called the "zone". Therefore, all possible telephone numbers may be divided into called number ranges roughly by zone, more finely by country code, and with increasing specificity as the length of the number prefix is extended. By the way of illustration, the called number prefix "+1" (dialed from anywhere in the world) defines a called number range that includes telephone numbers in North and Central America (the plus sign is an international convention that represents whatever the user must do in preface to making an international call; in the United States, that usually means dialing the digits "011," but the exact procedure varies from country to country). Similarly, the called number prefix of "+1404" defines a called number range that includes numbers in Atlanta. An exemplary CPC 35 of the present invention is configured to allow a number prefix having a maximum of 15 digits due to the fact that an international telephone number includes up to 15 digits by convention. However, should there be a reason to extend a called number prefix past the current number of 15 digits, the CPC 35 of the present invention maybe configured to do so. FIG. 5 is a flowchart illustrating the general steps involved in an exemplary method 320 for creating and editing a called number map (see step 320 of FIG. 3). The method begins at starting block 501 and proceeds to step 503, where a customer accesses a View/Create Called Number Map window 600 (see FIG. 6). As described with reference to FIG. 4, a View/Create Called Number Map window 600 may be accessed from a Call Pricing Center window 400 by clicking on the hyperlink 430 labeled "View/Create Called Number Map." Next in step 513, the customer is provided the option to add a new called number map or to edit an existing called number map. If the customer chooses to edit an existing called number map, the method proceeds to step 518, where a called number map is selected from a list of existing called number maps stored in memory. However if the customer chooses to create a new called number map, the method proceeds to step 523, where a name for the new map is chosen. From step 523, the method advances to step 528, where a traffic type (originating or terminating) is associated with the new called number map. Once a new called number map has been named and assigned a traffic type, or once a previously existing called number map has been selected from memory, the method proceeds to step 532, where an Edit Called Number Map window 700 (see FIG. 7) is accessed. At step 533, the called number map is edited using the interfaces provided by the Edit Called Number Map window 700. Editing the called number map may involve adding or changing the associated called number ranges, changing the name of the map or changing the traffic type. After the called number map has been edited, the method moves to step 538, where the called number map is saved and added to the list of existing called number maps stored in memory. The exemplary method 320 ends at step 540.

Figure 6:
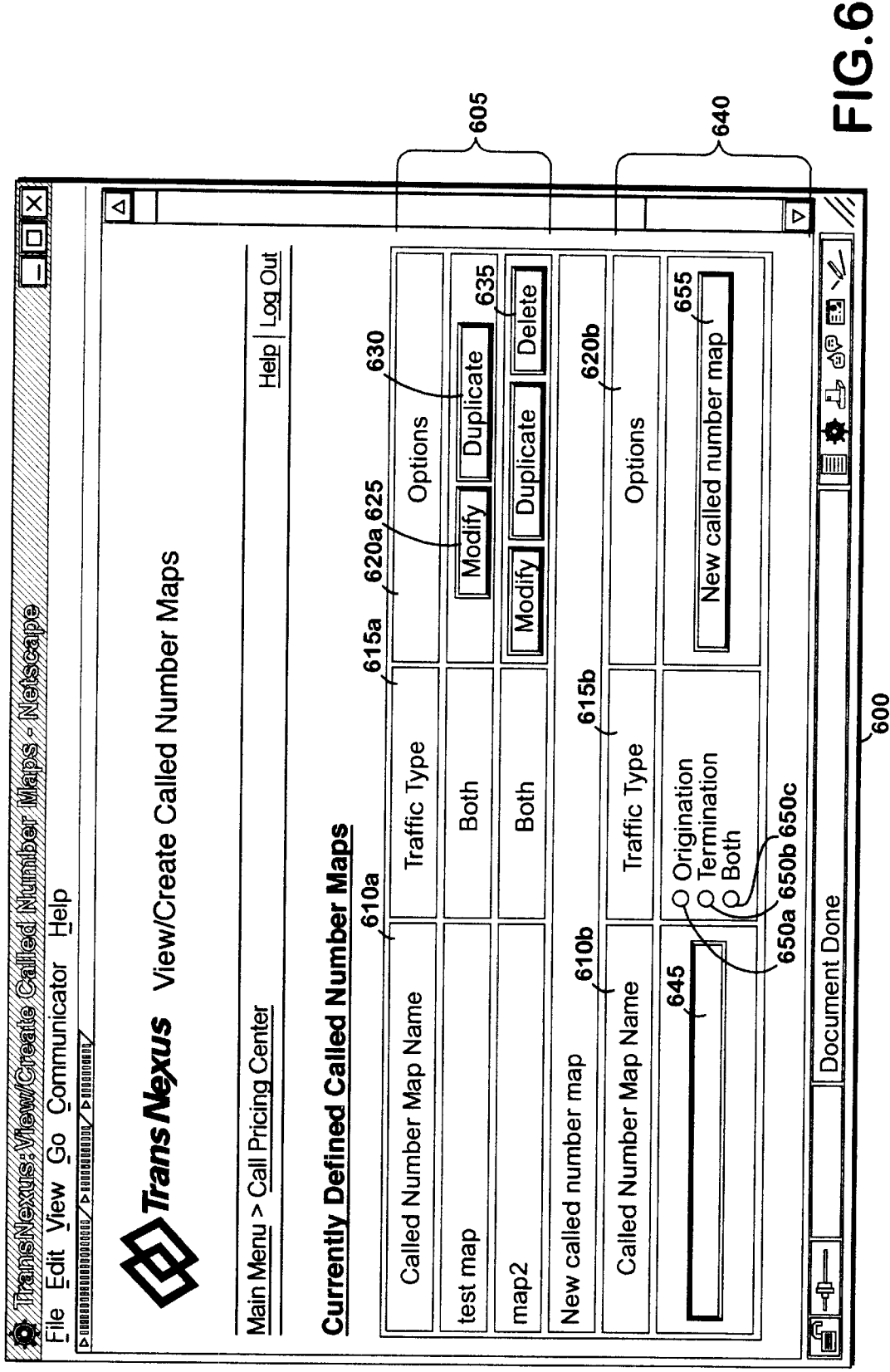
FIG. 6 shows an exemplary screen display of an illustrative View/create Called Number Map window.

In the View/Create Called Number map window 600 shown in FIG. 6, the customer is presented with the option to select a previously created called number map from a list of existing called number maps 605 that are stored in memory. As shown, the list of existing called number maps displays for each existing called number map a called number map name 610a, a traffic type 615a (which may be originating, terminating, or both), and a number of options 620a (which may include the option to modify 625, duplicate 630, or delete 635 the called number map). Selecting the duplicate option 630 causes the Edit Called Number Map window 700 (see FIG. 7) to be displayed including a copy of the information from the duplicated called number map. Selecting the modify option 625 also launches the Edit Called Number Map window 700, where the customer may enter any desired changes for the called number map. Selecting the delete option 635 allows the customer to delete any of the called number maps previously created. However, it should be noted that a called number map can only be deleted if it has not been assigned to a device. Once a called number map is assigned to a device, the device assignment must be deleted before the map may be deleted. Device assignment is explained below. It should be further noted that a called number map created by a partner (also referred to as a backbone operator) may be made available to that partner's customers in read-only mode. The partner may or may not allow its customers to create their own called number maps.

Figure 7:
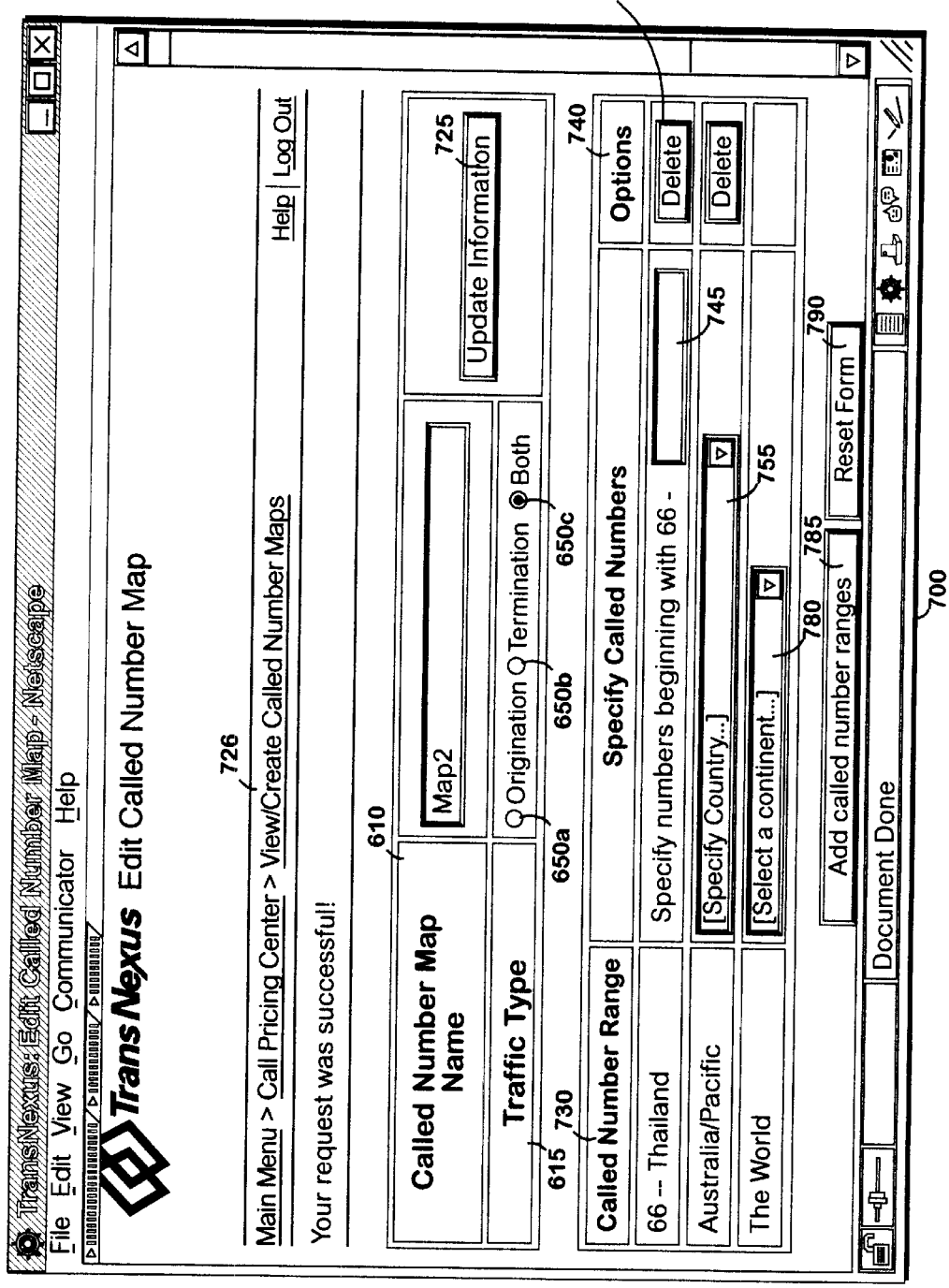
FIG. 7 shows an exemplary screen display of an illustrative Edit Called Number Map window.

The View/Create Called Number map window 600 also presents a new called number map area 640, where the customer has the option to create a new called number map by: typing a desired new called number map name 610b into a text box 645; selecting a radio button 650a–c corresponding to a traffic type 615b for the new called number map; and selecting the option 620b labeled "new called number map" 655, which causes the exemplary CPC 35 to display the Edit Called Number Map window 700 of FIG. 7.

Turning now to FIG. 7, an Edit Called Number Map window 700 is shown, which allows the customer to specify the called number ranges 730 to be included in the map that was created or selected in the View/Create Called Number Map window 600 of FIG. 6. For ease of reference, the called number map name 610 and the traffic type 615 for the called number map in consideration are displayed. Additionally, the customer is again presented with the option to change the traffic type using radio buttons 650a–c or to return to the View/Create Called Number map window 600 of FIG. 6 by way of hyperlink 725.

To specify a called number range, a customer may be first presented with a "select a continent" drop down menu 780. As shown in the called number range column 730, the called number range corresponding to the "specify a continent" drop down menu 780 is "The World." A called number range of "The World" represents all possible called numbers in the world. Accordingly, the "specify a continent" drop down menu 780 allows a customer to select a continent from a list of all continents in the world. Continents may correspond to zones in the following fashion: 1-North America and the Caribbean; 2-Africa; 3 and 4-Europe; 5-Central and South America; 6-Australia and the Pacific; and 7,8, and 9-Asia. When the customer chooses a continent from the "select a continent" drop down menu 780 and clicks the "add called number ranges" button 785, the name of the continent appears in the called number ranges column 730 and is associated with a "specify a country" drop down menu 755. In the example shown in FIG. 7, Australia/Pacific has been selected from the "select a continent" drop down menu 780. Using the "specify a country" drop down menu 755, the customer may further specify another called number range by selecting a country code from a list of all countries on that continent. It should be noted that additional continents from the "select a continent" drop down menu 780 may be selected at this point as well. The drop down menus may be designed not to display already selected choices. For example, the "select a continent" drop down menu 780 may list only those continents not yet selected. If a customer were to select each continent in creating called number ranges, then "The World" and the "select a continent" drop down menu 780 would not be displayed at all.

Selection of a country and activation of the "add called number ranges" button causes the name of the country to appear in the called number range column. Further drop down menus may be provided for specifying more and more specific called number ranges. In the exemplary embodiment, however, once a called number range corresponding to a country is selected, a text box 745 is presented for entering a specific called number prefix within that country. In this manner, the customer may divide any of the current called number ranges to more detailed called number ranges. The customer may even define a called number range as including specific individual telephone numbers, if desired.

As shown above, a unique feature of the CPC 35 is the granularity provided to allow customers the flexibility to assign rate plans to the last dialed digit, i.e., to a single telephone number. Every selection of a called number range returns an exhaustive division of all possible called numbers. Called number ranges are displayed in column 730 from most specific range to least specific range within a given prefix. The indication to the customer is that called number ranges are exceptions to ranges found lower on the list. In the example shown in FIG. 7, all called numbers within Thailand beginning with the country code 66 would fall into a first (most specific) range; all other called numbers beginning with 6 (the zone number corresponding to Australia/Pacific) would fall into the second range; all remaining called numbers (those beginning with 0, 1, 2, 3, 4, 5, 7, 8, or 9) would fall into the third range. The Edit Called Number Map window 700 also provides the customer with the option to delete any called number range, except "The World," that has previously been created in a given called number map. Customers may delete called number ranges by simply clicking the corresponding "Delete" button 760 in the "Options" column 740. Also, a customer may reset (clear) the entire called number map by selecting the "Reset Form" button 790.

Figure 8:
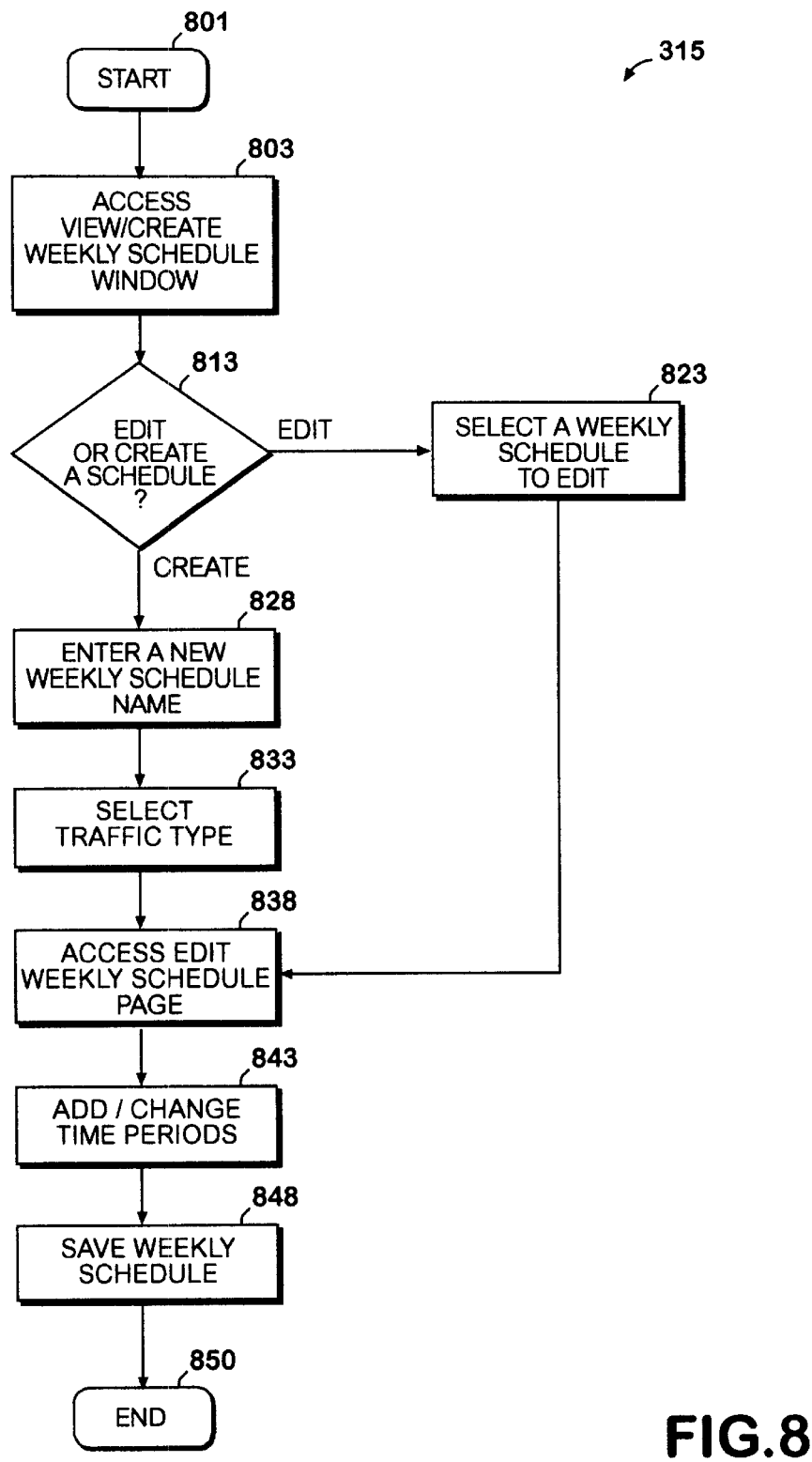
FIG. 8 is a flowchart showing the general steps involved in an exemplary method for creating and editing a weekly schedule.
Figure 9:
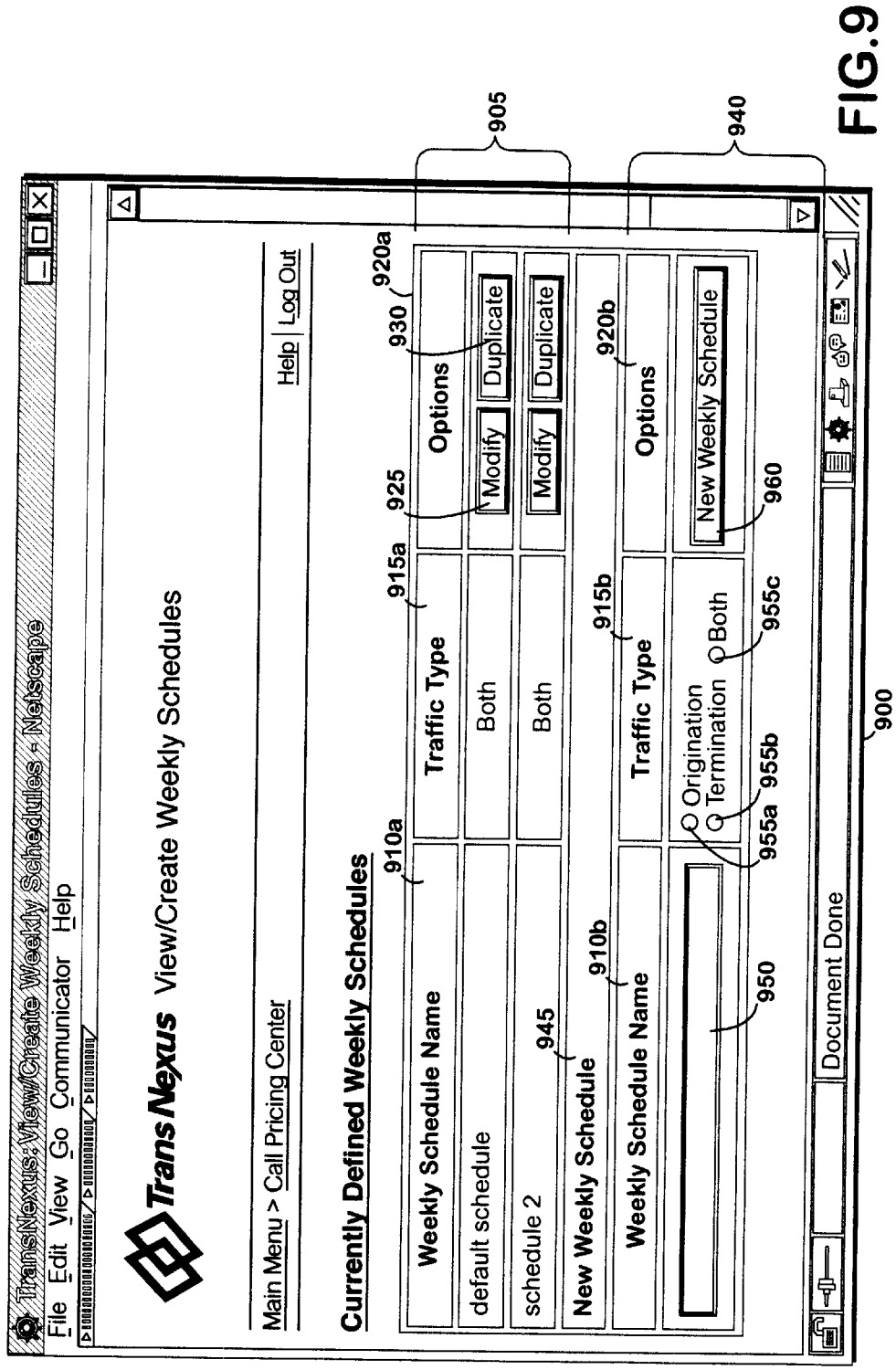
FIG. 9 shows an exemplary screen display of an illustrative View/create Weekly Schedule window.
Figure 10:
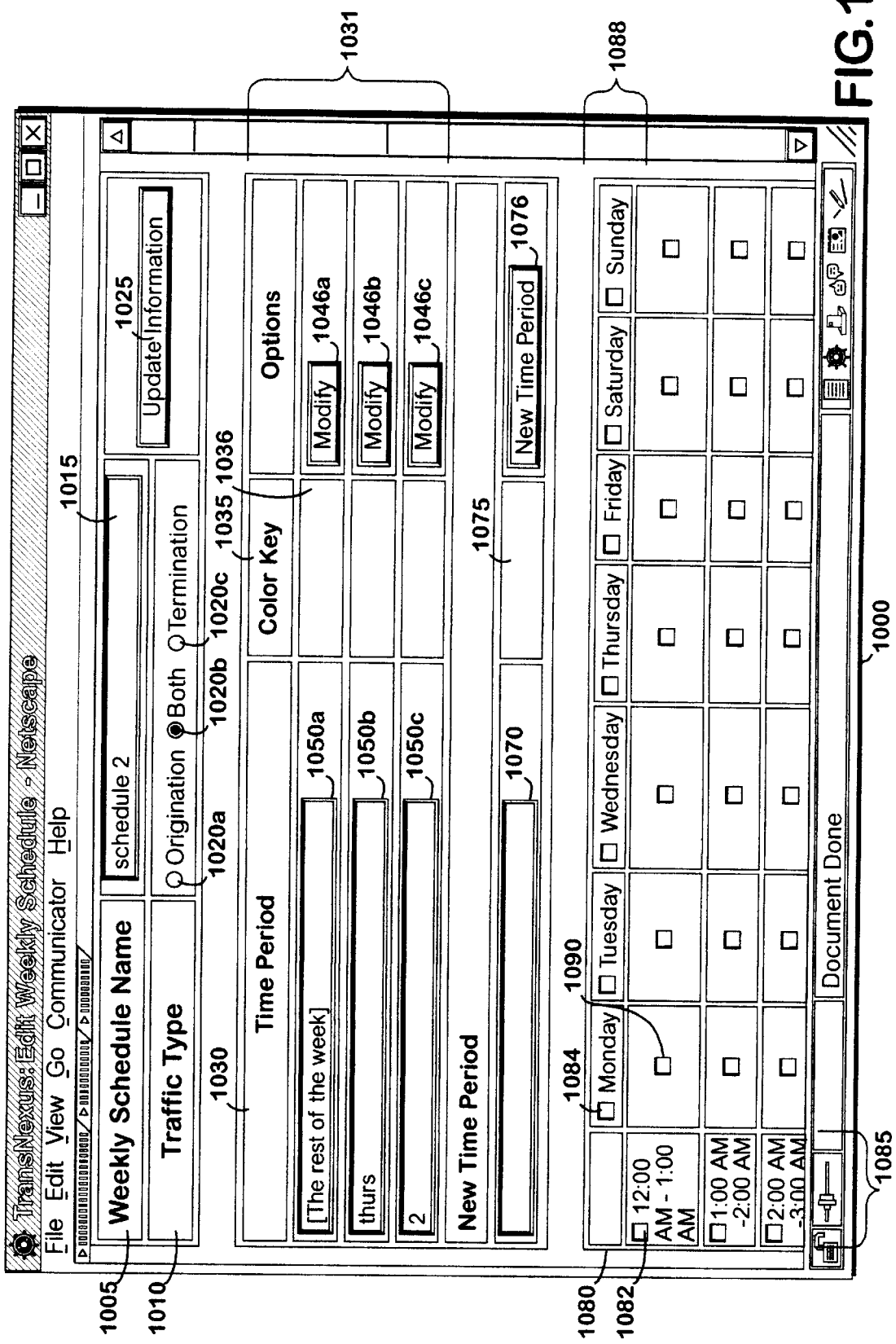
FIG. 10 shows an exemplary screen display of an illustrative Edit Weekly Schedule window.

FIGS. 8–10 are provided to illustrate an exemplary method of creating a new weekly schedule or editing an existing weekly schedule. As previously mentioned, a weekly schedule is created by dividing the hours comprising a week (Sunday through Saturday) into to a collection of customized time periods. Each time period comprises a range of hours selected from the 168 hours comprising a week.

FIG. 8 is flowchart illustrating the general steps involved in an exemplary method 315 for creating and editing a weekly schedule (see step 315 of FIG. 3). The method begins at the starting block 801 and proceeds to step 803, where a customer accesses a View/Create Weekly Schedule window 900 (see FIG. 9). As described with reference to FIG. 4, a View/Create Weekly Schedule window 900 may be accessed from a Call Pricing Center window 400 by clicking on the hyperlink 435 labeled "View/Create Weekly Schedule." Next in step 813, the customer is provided with the option to add a new weekly schedule or to edit an existing weekly schedule. If the customer chooses to edit an existing weekly schedule, the method proceeds to step 823, where a weekly schedule is selected from a list of existing weekly schedules stored in memory. However, if the customer chooses to create a new weekly schedule, the method proceeds to step 828, where a name for the new weekly schedule is chosen. From step 828, the method advances to step 833, where a traffic type (originating or terminating) is associated with the new weekly schedule.

Once a new weekly schedule has been named and assigned a traffic type, or once a previously existing weekly schedule has been selected from memory, the method proceeds to step 838, where an Edit Weekly Schedule window 1000 (see FIG. 10) is accessed. At step 843 the weekly schedule is edited using the interfaces provided by the Edit Weekly Schedule window 1000. Editing the weekly schedule may involve adding or changing the associated time periods, changing the name of the schedule or changing the traffic type. After the weekly schedule has been edited, the method moves to step 848, where the weekly schedule is saved and added to the list of existing weekly schedules stored in the memory. The exemplary method 315 ends at step 850.

In the View/Create Weekly Schedule window 900 shown in FIG. 9, the customer is presented with the option to select a previously created weekly schedule from a list of existing weekly schedules 905 that are stored in memory. As shown, the list of existing weekly schedules displays for each existing weekly schedule a weekly schedule name 910a, a traffic type 915a (which may be originating, terminating, or both), and a number of options 920a (which may include the option to modify 925, or duplicate 930 the weekly schedule). Selecting the duplicate option 930 causes the Edit Weekly Schedule window 1000 (see FIG. 10) to be displayed including a copy of the information from the duplicated weekly schedule. Selecting the modify option 925 also launches the Edit Weekly Schedule window 1000, where the customer may enter any desired changes for the selected weekly schedule. It should be noted that a weekly schedule created by a partner (also referred to as a backbone operator) may be made available to that partner's customers in read-only mode. The partner may or may not choose to allow its customers to create their own weekly schedules.

The View/Create Weekly Schedule window 900 also presents a new called number map area 940, where the customer has the option to create a new weekly schedule by: typing a desired new weekly scheduled name 910b into a text box 950; selecting a radio button 955a–c corresponding to a traffic type 915b for the new weekly schedule; and selecting the option button 920b labeled "New Weekly Schedule" 960, which causes the exemplary CPC 35 to display the Edit Weekly Schedule window 1000 of FIG. 10.

Now turning to FIG. 10, an exemplary Edit Weekly Schedule window 1000 is shown. The exemplary Edit Weekly Schedule window 1000 allows the customer to configure the time periods 1030 to be included in the weekly schedule that was created or selected in the View/Create Weekly Schedule window 900 if FIG. 9. Additionally, the customer is again presented with the option to change the traffic type 1010 using the radio buttons 1020a–c or change the name of the weekly schedule 1005 by using the text box 1015. The customer may save the changes to memory by using the "Update Information" button 1025.

The customer may begin to configure a weekly schedule, by creating time periods 1030. As mentioned previously, time periods are collections of time intervals within the 168 hours comprising a week. When the weekly schedule is assigned to a rate plan, as was described with reference to step 335 of FIG. 3, the customer may assign a specific rate to any time period within the weekly schedule. Time periods may be configured by selecting certain times of a day, entire days of a week, or some combination of the two. Therefore, in order to provide a great deal of flexibility in creating schedules, the exemplary CPC 35 allows customers to select from each of the 168 hours in a week individually.

To configure a time period, the customer may be presented with a week chart 1080 with the days of the week running across the top row 1088, and the hours of the day running down the left column 1085 in the form of a grid having 168 checkboxes 1090. To create a new time period, the customer may name the period using text box 1070 in the New Time Period column 1066. The customer may then proceed to select hours to be included in the time period by clicking the desired check boxes 1090 corresponding to the hours they wish to include in the time period. The customer may choose to include in the time period a certain hour for all days of a week by clicking on the check boxes corresponding to that hour in the hours of the day column 1085. For example, by selecting the check box 1082, the customer can include in a time period the hour between 12:00 A.M. and 1:00 A.M. in all days of the week. Likewise, by selecting a check box in the days of a week row 1088, such as checkbox 1084, every checkbox corresponding to every hour in the corresponding day of the week may be automatically selected.

Once the desired hours have been selected, the customer may click the "New Time Period" button 1076, and the page redraws with the selected hours colored with a unique color key 1075. Additionally, the new time period is added to the existing time period list 1031 with the name of the new time period appearing in time period column 1030 and the color key associated with the time period appearing in the color key column 1035. In the same manner the customer may proceed to add additional time periods, each of which will be assigned a unique color. Those hours that are not selected are associated with a time period of their own, which typically appears with a white color key 1036 and has the default name "the rest of the week" 1050.

Additionally, it should be noted that the customer may change the name of any time period in the existing time period list 1031 by using the text boxes 1050a–c and clicking the corresponding "Modify" button 1046a–c. The hours may be added or deleted from an existing time period by clicking on the appropriate check boxes and then clicking on the "modify" button 1046a–c corresponding to the time period.

A time period cannot be deleted explicitly. However, if all the hours in a time period are reassigned to other time periods belonging to the same weekly schedule, then that period is deleted from the schedule and the unique color corresponding to the time period is reassigned to the remaining time periods. Additionally, when a customer who is a partner (also referred to a backbone operator) creates a weekly schedule, the schedule may be made available to that customer's customers in read-only mode. The Partner may or may not allow its customers to create their own weekly schedules.

Figure 11:
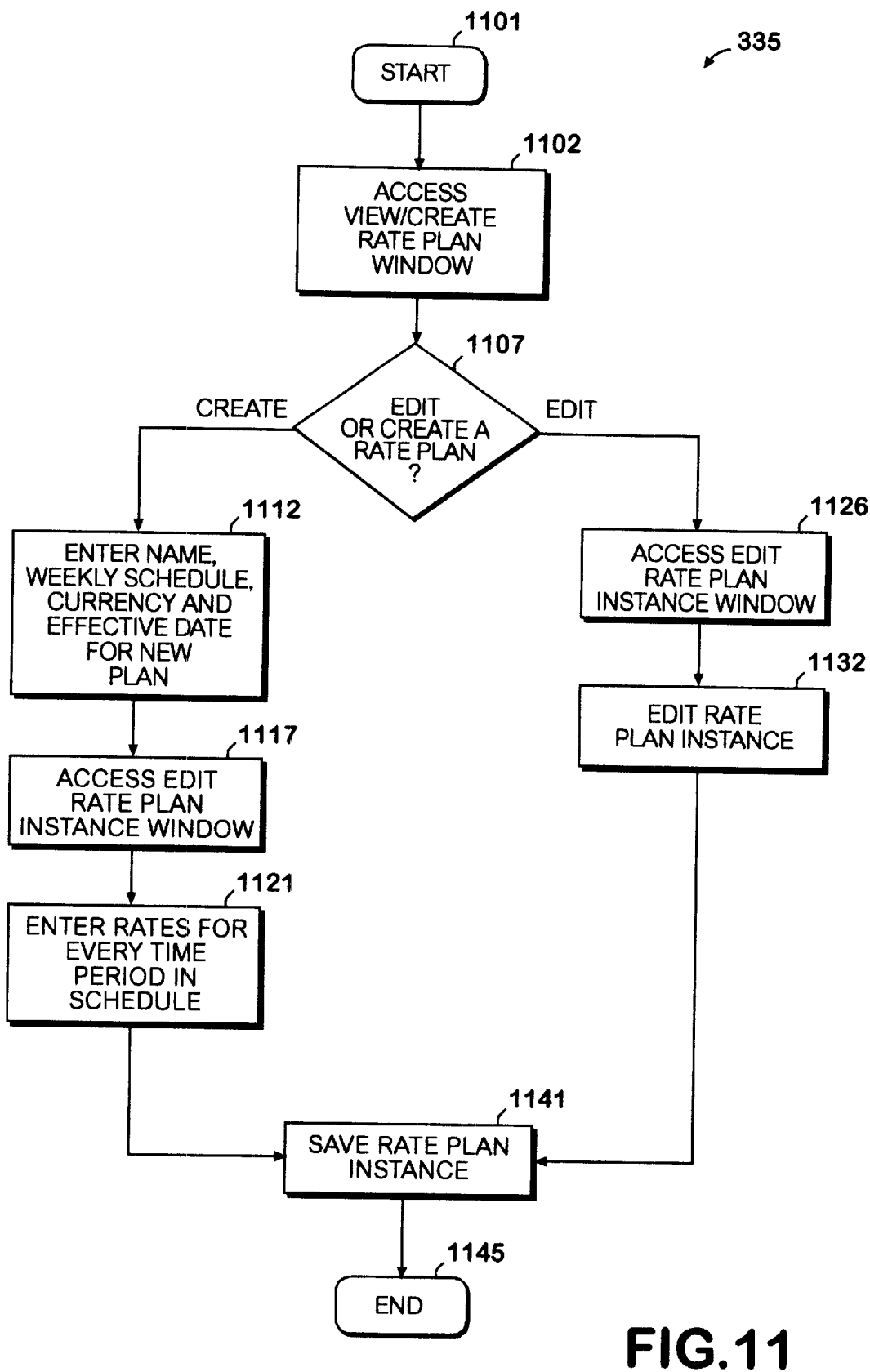
FIG. 11 is a flowchart showing the general steps involved in an exemplary method for creating and editing a rate plan instance.

FIGS. 11–13 are provided to illustrate an exemplary method of creating and editing a rate plan. A rate plan is created by assigning rates for Internet telephony services, in a particular currency, to each time period within a weekly schedule. Therefore, a rate plan cannot be created without first creating a weekly schedule. Once a rate plan is created, it may be assigned to several different called number ranges associated with any number of different devices. Called number maps containing called number ranges, can be assigned to originating devices, to terminating devices or to both. Weekly schedules can also be assigned to originating rate plans, to terminating rate plans or to both.

FIG. 11 is a flowchart illustrating the general steps involved in an exemplary method 335 of creating and editing a rate plan (see step 335 of FIG. 3). From starting block 1101, the method proceeds to step 1102, where a View/create Rate Plan window 1200 (see FIG. 12) is accessed. Next at step 1107, a determination is made as to whether the customer chooses to edit an existing rate plan or to create a new rate plan. If the customer elects to edit an existing rate plan, the method advances to step 1126, where an Edit Rate Plan Window 1300 (see FIG. 13) is accessed. Using the interfaces of the Edit Rate Plan Window 1300, the existing rate plan may be edited at step 1132. Editing a rate plan may involve modifying, superceding, or deleting the rate plan.

If the customer elects at step 1107 to create a new rate plan, the method proceeds to step 1112, where a new rate plan name is entered, a weekly schedule is selected to be associated with the new rate plan, and a currency and rate plan effective date are chosen. The method then proceeds to step 1117, where the Edit Rate Plan window 1200 (see FIG. 12) is accessed. Using the interfaces provided by the Edit Rate Plan window 1200, rates may be entered in the chosen currency for every time period in the weekly schedule associated with the new rate plan. After a new rate plan is created at step 1121 or after an existing rate plan is edited at step 1132, the method proceeds to step 1141, where the rate plan instance is storing in memory such that it is ready to be put into effect upon the occurrence of the rate plan effective date. The exemplary method 335 ends at step 1145.

An exemplary Edit Rate Plan window 1200 is shown in FIG. 12. As previously mentioned, a rate plan is specific to an originating customer or a terminating customer. In other words, an originating rate plan is not interchangeable with a terminating rate plan in an exemplary embodiment of the present invention. The exemplary Edit Rate Plan window 1200 is designed to facilitate the creation of an originating rate plan. For ease of reference, the Edit Rate Plan window 1200 displays the rate plan name 1210, the currency 1215, the weekly schedule 1220 and the rate plan effective date 1225 associated with each rate plan stored in memory. Upon selecting an existing rate plan to be edited, the customer may select an editing option from the options column 1222. Specifically, the customer may select the delete option button 1228, the modify option button 1229 or the supercede option button 1227. The delete option causes the selected rate plan to be removed from memory. It should be noted that a rate plan instance can only be deleted if that rate plan is not already assigned to a device. In order to delete a rate that is currently assigned to a device, the device assignment itself must first be deleted.

The modify option launches the Edit Rate Plan window 1300 (see FIG. 13) and automatically places the information relating to the selected rate plan in the fields thereof, so that the customer may alter the selected rate plan. The supercede option also launches the Edit Rate Plan window 1300. Superceding an existing rate plan instance with a new instance changes changing the pricing or schedule information associated with that rate plan, but without requiring the customer to reassign rate plans to called number ranges. Superseding a rate plan instance creates a separate and identical rate plan instance for the same rate plan with an effective date one day later than the rate plan instance superseded.

It should be further noted that in the exemplary View/ create Rate Plan window 1200, all instances of a single rate plan are grouped together. The default appearance of the rate plan name column 1210 shows only the most recently created instance of those rate plans with multiple instances. Those rate plans with multiple rate plan instances associated with them have a button 1211 by their names. The customer can view all the rate plan instances associated with the rate plan by clicking on the button 1211 which displays a drop down window to show all the rate plan instances in reverse chronological order.

It should be further noted that rate plan instances with multiple instances associated with them can only be deleted when their rate plans are expanded in this way, so as to prevent customers from deleting an entire rate plan when only intend to delete one of its instances. Additionally, it should be noted that only the most recent instance from a rate plan can be superseded as described above. Superceding a rate plan instance gives the customer flexibility to create new rate plan instances quickly by reusing the preferences for existing rate plans. Superseded instances therefore may have different currencies, schedules, and rates, and must have a different effective date. When a Partner creates a rate plan, it is available to that Partner's Customers in read-only mode. It should however be noted that if a Partner chooses to do so they may allow their Customers to create their own rate plans. The View/create Rate Plan window 1200 also provides graphical devices to enable the customer to create a new rate plan. For example, a rate plan name 1230 may be entered in the text box 1235. A currency for the rate plan may be selected from a list of currencies displayed in the currency drop down menu 1236. Similarly, a weekly schedule (stored in memory) to be associated with the rate plan may be selected from the "select a schedule" drop down menu 1240 and a rate plan effective date may be selected from the "select date" drop down menus 1275a–c.

As mentioned, a customer must have at least one existing account with the clearinghouse 50 before creating a rate plan. The customer chooses a currency to associate with the rate plan from the list of currencies associated with an existing account. The effective date may be either a future date or a past date, which will indicate that the rate plan is to go into effect as soon as the assignment of the rate plan to a device goes into effect. Those skilled in the art will appreciate that the currencies associated with the rate plan could be any currency and the effective date could be any date in the past or the future or restricted to certain ranges decided by the clearinghouse 50. Once a customer selects a currency, weekly schedule and rate plan effective date, he may click on the "new rate plan" button 1264, to launch the Edit Rate Plan window 1300.

Turning to FIG. 13, an exemplary Edit Rate Plan window 1300 is described. The customer may begin to assign rates to time periods by entering a rate in the text boxes 1380 for each of the time periods displayed in the time periods column 1365. Each time period displayed in the time periods column 1365 is associated with the weekly plan that was earlier selected for association with the new rate plan instance. Rates are based on a per call unit in the currency specified earlier in the View/create Rate Plan window 1200 for the new rate plan. A call unit is typically one minute, but those skilled in the art will recognize that the call unit could be one page for fax calls, or some other appropriate unit for video communications. Customers can also choose the option of not originating (or terminating) calls during any of the time periods in the weekly schedule associated with the new rate plan instance by unchecking the check boxes 1385 displayed in the "allow termination during this period" column 1375. This allows the customers flexibility to create customized rate plans. For instance, this option allows the creation of nighttime or weekend rate plans.

It should be noted that in an exemplary embodiment, once the customer creates the rate plan, the associated weekly schedule cannot be deleted from the list of weekly schedules. However, the weekly schedule associated with the new rate plan instance can be edited, as described earlier in step 315 of FIG. 3, by adding, deleting or modifying time periods. Deleted time periods will simply be deleted from the corresponding rate plans and will not be displayed in the column 1365. Therefore, deleted time periods cannot be assigned rates. It should be noted further that if a customer adds a new time period to the weekly schedule, that time period will initially be assigned a "do not originate/terminate" status with the appropriate check box 1385 initially unchecked. The customer can change this status by simply clicking on the associated check box. Once the customer has entered the preferred rates and decided whether they want handle any traffic at all during the time periods, the customer may authorize the new plan by clicking on the "submit rate plan" button 1390. An authorized rate plan is stored such that it is ready to be put into effect upon the occurrence of the rate plan effective date.

Figure 14:
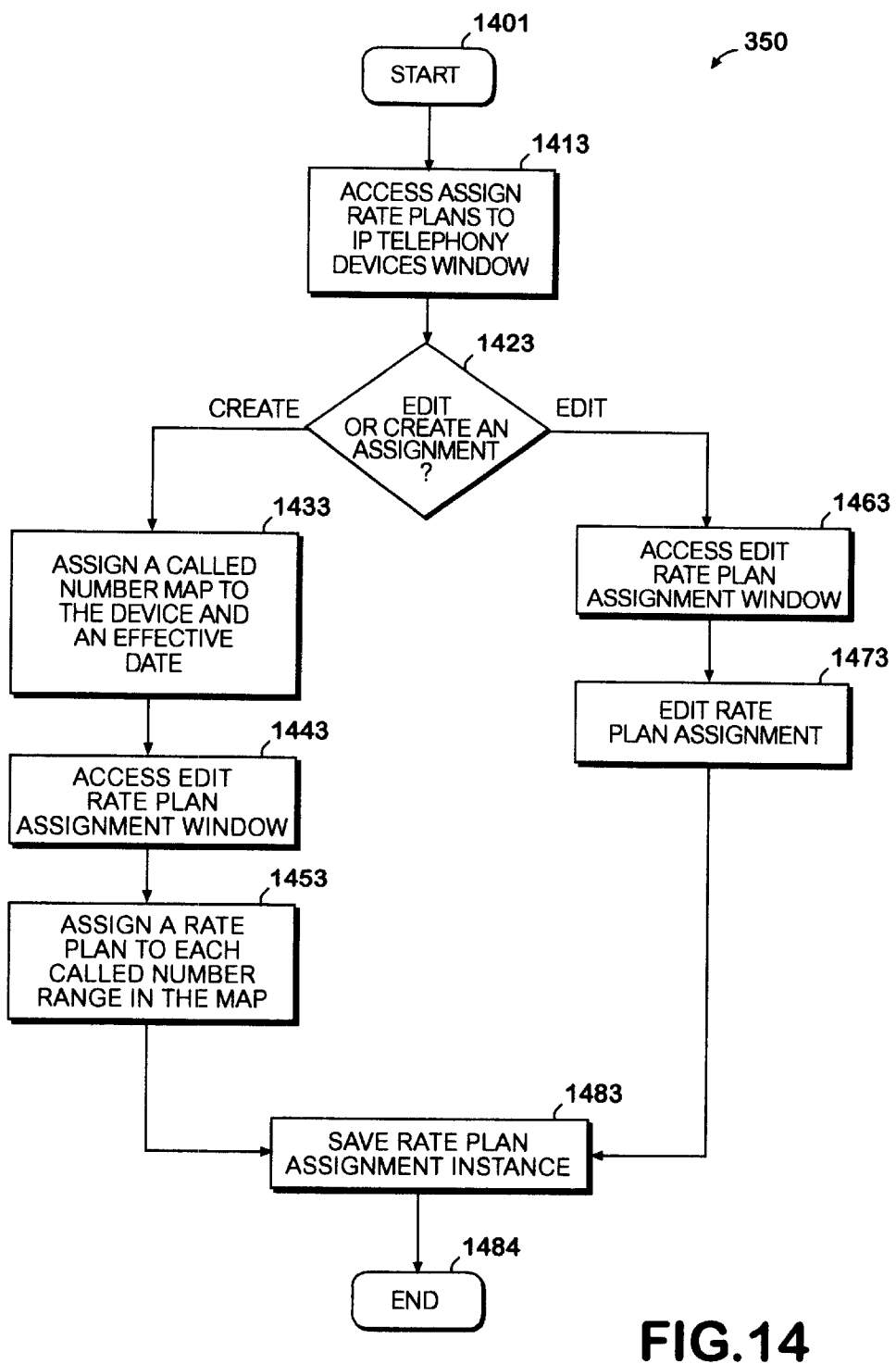
FIG. 14 is a flowchart showing the general steps involved in an exemplary method of assigning devices to called number maps and assigning rate plans to called number ranges.

Turning now to FIGS. 14–16, an exemplary method of assigning devices to a rate plan and editing a existing assignment will be described. Once a customer has configured at least one called number map, configured at least one rate plan and has enrolled at least one device, it may proceed to assign a rate plan to a device. It should be noted that rate plan assignments are effective for either originating traffic or terminating traffic.

FIG. 14 is a flowchart illustrating the general steps involved in an exemplary method 350 for creating and editing a rate plan assignment instance. The method begins at the starting block 1401 and proceeds to step 1413, where an Assign Rate Plans to IP Telephony Devices window 1500 is accessed. Next in step 1423 the customer is given a option to edit an existing assignment or to create a new one. If the customer chooses to create a new assignment instance, the customer proceeds to step 1433 to select an enrolled device and associate it with a previously created called number map. At step 1433, the customer may also specify an "assignment effective date," which defines the date for the assignment to take effect. The method next advances to step 1443, where an Edit Rate Plan Assignment window 1600 is accessed. Using the interfaces of the Edit Rate Plan Assignment window 1600, the rate plan is assigned to each called number range belonging to the selected called number map at step 1453.

If the customer chooses to edit an existing rate plan assignment at step 1423, the method proceeds to step 1463, where the Edit Rate Plan Assignment window 1600 is accessed. Then, at step 1473, the preferences set earlier for an existing assignment are edited. Once the customer has completed editing the assignment in step 1473, or once a rate plan is assigned to each called number range belonging to the selected called number map at step 1453, the method proceeds to step 1483, where the rate plan assignment instance is saved in memory. The exemplary method ends at step 1484. FIG. 15 shows an exemplary Assign Rate Plans to IP Telephony Devices window 1500. If a customer chooses to create a new rate plan assignment, a device may be selected from the list of unassigned devices displayed in the IP telephony device name column 1535. A called number map may then be selected from a list of called number maps included in the "select a called number map" drop down menu 1540. The selected called number map is assigned to the selected device by the exemplary CPC 35. The customer may then choose an assignment effective date by selecting from the "assignment effective date" drop down menus 1550*a–c*.

The clearinghouse 50 may require that the assignment effective date of a rate plan assignment be no less than some fixed amount of time in the future. Alternately, the customers may be permitted to set rate plan assignments into effect immediately, in real time. All rate plan changes preferably go into effect either immediately, if the effective date is in the past, or at midnight device local time. Those skilled in the art will recognize that the date for the assignment to go into effect can be any date in the future or the past. The device local time may be determined by the local time and the daylight savings rules assigned to the device when it is enrolled with the clearinghouse 50. The exemplary Assign Rate Plans to IP Telephony Devices window 1500 permits a customer to add a new assignment to the list of existing assignments by clicking on the "New IP Telephony Device Assignment" button 1570. As each configured device can have only one assignment, the list of devices available for assignment shrinks as the customer creates new assignments.

Selecting an existing rate plan assignment from the IP Telephony Device Name column 1510 and clicking on the corresponding modify button 1519 or supercede button 1520 causes an Edit Rate Plan Assignment window 1600 to be launched, which is shown in FIG. 16. Assignment instances may also be deleted by way of an appropriate delete button 1525. Superseding an assignment creates a new, empty assignment instance with an assignment effective date one day later than the superseded assignment instance. A customer can then change the assignment effective date and configure the assignment instance in the Edit Rate Plan Assignment window 1600.

The different assignment instances for a single device are grouped together in the exemplary Assign Rate Plans to IP Telephony Devices window 1500. The latest assignment instance appears by default, but the customer can click a button 1531 to expand or contract the list of assignment instances for a particular device. If a device has more than one assignment instance, and the corresponding rate plans have more than one instance, then the assignment effective date takes precedence over the rate plan effective date in determining the overall effective date.

FIG. 16 shows an exemplary Edit Rate Plan Assignment window 1600 that is specifically configured for voice calls. Those skilled in the art, however, will recognize that the window may be readily configured for fax or video call types. The voice traffic table 1612 displays in the called number ranges column 1610 all called number ranges contained in the called number map that is assigned to the device. The primary purpose of the Edit Rate Plan Assignment window 1600 is to enable the customer to assign a rate plans to each of the called number ranges associated with the device for each type of call. The customer can assign a rate plan to each called number range by selecting a rate plan from a "rate plan" drop down list 1635.

Both origination and termination rate plan assignments allow the customer to specify that no calls are to be completed to any given called number range. The customer can choose to do so by unchecking the appropriate "allow origination to the location" check box 1645. It should be noted that the default choice for each called number range is not to complete calls to those called numbers. If the customer subsequently adds a called number range to the called number map associated with the rate plan assignment, then that called number range appears as not accepting calls. It should be further noted that a rate plan must be assigned to a called number range in order for any calls to be completed to that called number range.

The Edit Rate Plan Assignment window 1600 also allow a customer to specify other preferences to be used in making call routing decisions. Maximum latency delay 1620 and the routing priority 1625 are two additional preferences that may be specified in the illustrative Edit Rate Plan Assignment window 1600. Those skilled in the art will recognize that other preferences besides those shown in the exemplary Edit Rate Plan Assignment window 1600 may be added. The routing engine 110 associated with the clearinghouse 50 may use these additional preferences to provide the originating gateway 108 with a prioritized list of terminating gateways 114a–c capable of terminating the call. In particular, the routing engine 110 may prioritize the list according to the preferences selected by the customer thereby differentiating among the several terminating gateways that are each capable of terminating the call.

In the exemplary embodiment the routing priority 1625 is selected form the following criteria: least cost, least delay and same autonomous system. For example, if the customer chooses the maximum delay to be 200 milliseconds and the routing priority to be least cost, then the routing engine 110 will provide the originating gateway 108 with a list of terminating gateways that can terminate the call within the price criteria set by the originating customer, within the 200 millisecond delay, prioritized in ascending order from least to most costly. Choosing a routing priority of "same autonomous system" ensures that the call routing will be prioritized to so that the calls will be terminated using a terminating gateway using a network management common to that of the originating gateway. This ensure reduced packet loss and delays. The routing priority may also include a preferred routing criterion, allowing an originator to specify a particular terminator to be selected, overriding the choices of least cost or best quality. Those skilled in the art should recognize that the routing priority choices can include other criteria besides the ones listed in the exemplary preferred embodiment.

Figure 17:
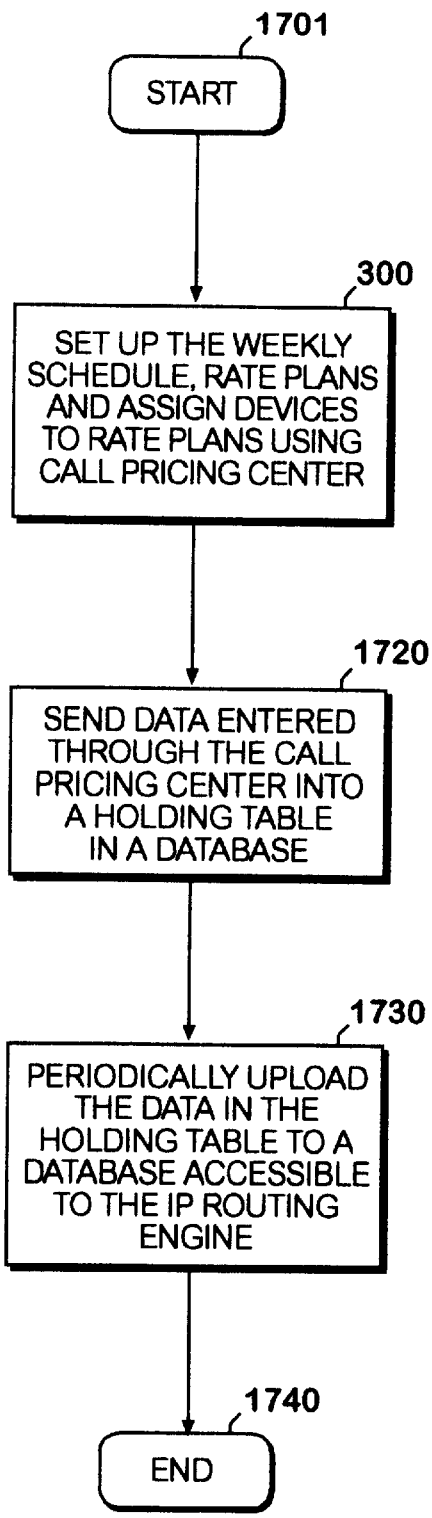
FIG. 17 is a flow chart illustrating the general flow of information between an exemplary call pricing center and a call routing engine.

In the Edit Rate Plan Assignment window 1600, the customer may specify the maximum delay by choosing from a "maximum delay" drop down menu 1640. The time intervals included in the "maximum delay" drop down menu are preferably expressed milliseconds. Those skilled in the art will appreciate that the intervals or the range of delay scan be changed to any desired set of choices. Similarly, the routing priority may be specified by selecting one of the "routing priority" radio buttons 1646. FIG. 17 is a flow chart illustrating the general flow of information between an exemplary CPC 35 of the present invention and a call routing engine. The method 1700 begins at starting block 1701 and advances to step 300, which represents the overall method for using an exemplary CPC 35 to define call prices and pricing criteria, described with reference to FIG. 3. Once the customer completes the tasks of configuring call pricing information in step 300, the preferences and preference criteria associated with a customer are entered into a holding table in a database 120 (see FIG. 2) at step 1720. Then, at step 1730, the service point operator 125 may periodically upload the data from the holding table into tables accessible by the routing engine 110. Based on the effective dates of rate plan assignments and rate plans themselves, the routing engine 110 may begin using call pricing information to provide the originating gateway 108 with routing information necessary to complete the calls in a desired manner. The method 1700 ends at step 1740.

While this invention has been described in detail with particular reference to preferred embodiments thereof, it will be understood that variations and modifications can be effected within the spirit and scope of the invention as described herein above and as described in the appended claims. In particular, various user interface configurations have been described with reference to exemplary embodiments of the present invention. Such user interface configurations have been selected based on ease of use and logical organization and presentation considerations. Those skilled in the art, however, will recognize that other type of user interface configurations may be implemented without departing from the spirit and scope of the present invention. For example, the user interface configurations of the present invention are not intended to be limited to the specific drop down menus, buttons, text boxes, hyperlinks, etc. that have been described herein. Other graphical devices for presenting information and choices to a user are well known in the art and incorporation or substitution of such graphical devices in the present invention are considered to be within the skill of the art.

We claim:

1. A computer-implemented method for defining pricing information to be used by a routing engine for determining a preferred route for routing an Internet Protocol (IP) transaction via an IP network, comprising the steps of:

creating a time period schedule comprising at least one time period to which a selected rate for routing an IP transaction is to be applied;

creating a map comprising at least one IP transaction range to which a selected rate plan instance is to be applied, the range comprising at least one number for the IP transaction;

creating the rate plan instance by associating a rate with each time period included within the time period schedule;

creating a rate plan assignment instance by associating at least one device of the IP network with the map; and associating the rate plan instance with each range included in the map.

2. The method of claim 1, wherein the time period schedule corresponds to a predetermined unit of time comprising at least one range of time; and wherein the step of creating the time period schedule comprises associating with each time period at least one selected range of time.

3. The method of claim 1, wherein the time period schedule comprises a first time period and a second time period; and wherein defining a rate plan instance comprises associating a first rate with the first time period and associating a second rate with the second time period.

4. The method of claim 1 further comprising the step of defining at least one preference to be associated with the range.

5. The method of claim 4, wherein the preference comprises a certain preference selected from a group comprising a delay tolerance, a routing priority, a determination of autonomous system matching, a determination of domain matching, a determination of specified platform system matching, and a maximum autonomous system hop count.

6. The method of claim 1 further comprising the steps of:
   defining a plurality of preferences to be associated with the range;
   defining at least one preference criteria; and
   wherein a determination is made from the preference criteria as to which of the preferences apply to one of the devices of the IP network.

7. The method of claim 6, wherein the preference criteria comprises a date on which a selected preference is to be applied.

8. The method of claim 1 further comprising the step of defining a date for the rate plan instance to become effective.

9. The method of claim 1, wherein the IP transaction comprises a telephony call to be routed via the IP network and the number comprises a called number associated with the telephony call.

10. A method for defining pricing information to be used by a routing engine for determining a preferred route for routing an Internet Protocol (IP) transaction via an IP network, comprising the computer-implemented steps of:
    creating a time period schedule comprising at least one time period to which a selected rate for routing an IP transaction is to be applied;
    creating a map comprising at least one IP transaction range to which a selected rate plan instance is to be applied, the range comprising at least one identifier for the IP transaction;
    creating the rate plan instance by associating a rate with each time period included within the time period schedule;
    creating a rate plan assignment instance by associating at least one device of the IP network with the map; and
    associating a rate plan instance with each range included in the map.

11. The method of claim 10 wherein the time period schedule corresponds to a predetermined unit of time comprising at least one range of time; and
    wherein the step of creating the time period schedule comprises associating with each time period at least one selected range of time.

12. The method of claim 1 further comprising the step of defining at least one preference to be associated with the range.

13. The method of claim 12, wherein the preference comprises a delay tolerance.

14. The method of claim 12, wherein the preference comprises a routing priority.

15. The method of claim 12, wherein the preference relates to a determination of autonomous system matching.

16. The method of claim 12, wherein the preference relates to a determination of domain matching.

17. The method of claim 12, wherein the preference relates to a determination of specified platform system matching.

18. The method of claim 12, wherein the preference relates to a maximum autonomous system hop count.

19. The method of claim 10, further comprising the steps of:
    defining a plurality of preferences to be associated with the range;
    defining at least one preference criteria; and
    wherein a determination is made from the preference criteria as to which of the preferences apply to the each device of the IP network.

20. A computer-implemented method for defining pricing information to be used by a routing engine for determining a preferred route for routing an Internet Protocol (IP) transaction via an IP network, comprising the steps of:
    creating a time period schedule comprising at least one time period to which a selected rate for routing an IP transaction is to be applied;
    creating a map comprising at least one IP transaction range to which a selected rate plan instance is to be applied, the range comprising at least one identifier for the IP transaction;
    creating the rate plan instance by associating a rate with each time period included within the time period schedule; and
    creating a rate plan assignment instance by associating at least one device of the IP network with the map.

* * * * *